US008402189B2

(12) United States Patent
Koga et al.

(10) Patent No.: US 8,402,189 B2
(45) Date of Patent: Mar. 19, 2013

(54) INFORMATION PROCESSING APPARATUS AND DATA TRANSFER METHOD

(75) Inventors: Tsutomu Koga, Matsuda (JP); Yo Iwaoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 12/812,825

(22) PCT Filed: May 13, 2010

(86) PCT No.: PCT/JP2010/003231
§ 371 (c)(1),
(2), (4) Date: Jul. 14, 2010

(87) PCT Pub. No.: WO2011/141963
PCT Pub. Date: Nov. 17, 2011

(65) Prior Publication Data
US 2011/0283037 A1    Nov. 17, 2011

(51) Int. Cl.
G06F 13/42    (2006.01)
G06F 13/36    (2006.01)
G06F 13/20    (2006.01)
G06F 11/00    (2006.01)
G06F 13/00    (2006.01)
G01R 31/08    (2006.01)
H04L 12/28    (2006.01)

(52) U.S. Cl. ... 710/106; 370/216; 370/225; 370/395.31; 710/306; 710/313; 710/316

(58) Field of Classification Search .................. 710/106, 710/305–306, 311–312, 317; 709/238–239, 709/242–244; 370/396, 398, 395.31, 216–228; 714/100, 1–4.2
See application file for complete search history.

(56) References Cited

U.S. PATENT DOCUMENTS 7,290,168 B1 * 10/2007 DeKoning .................. 714/5.11
2007/0073960 A1    3/2007 Ogawa et al.
2008/0239945 A1 * 10/2008 Gregg ......................... 370/217
2012/0030380 A1 *  2/2012 Yanagimachi ................ 710/15

FOREIGN PATENT DOCUMENTS

EP        2182443 A1    5/2010
JP       2007-316755    12/2007

OTHER PUBLICATIONS

Dictionary.com Unabridged. Entry 'terminal'. Based on the Random House Dictionary. 2012. Retrieved from Internet Jul. 13, 2012. <http://dictionary.reference.com/browse/terminal>.*

* cited by examiner

Primary Examiner — Thomas J Cleary
(74) Attorney, Agent, or Firm — Brundidge & Stanger, P.C.

(57) ABSTRACT

An object is to provide an information processing apparatus capable of improving the availability as a system while improving the reliability of a data transfer path and a data transfer method. An information processing apparatus has a data transfer path branching in a tree structure, from a root node to a plurality of nodes while communicably coupling therebetween and transmitting serial data between the root node and the plurality of nodes, including two internode data transfer paths provided between at least a pair of nodes of the plurality of nodes, through which serial data transfer is performed; and a routing processing unit provided to each terminal nodes that are the nodes on both ends of the internode data transfer path, transfers the return data from the transmission destination node to the transmission source node by using the same internode data transfer path as the internode data transfer path used for data transfer to the transmission destination node, when each of the terminal nodes transfers data received from any of another nodes being a transmission source to any of the nodes being a transmission destination via the other terminal node.

11 Claims, 30 Drawing Sheets

ROUTING TABLE 1216A
(PCIe SWITCH A)

| ENTRY | TRANSMISSION SOURCE | TRANSMISSION DESTINATION | PORT NUMBER | ENABLE FLAG | ENTRY | TRANSMISSION SOURCE | TRANSMISSION DESTINATION | PORT NUMBER | ENABLE FLAG |
|---|---|---|---|---|---|---|---|---|---|
| 1 | R1 | D1 | 1 | 1 | 29 | D4 | R1 | 0 | 1 |
| 2 | R1 | D2 | 2 | 1 | 30 | D4 | D1 | 1 | 1 |
| 3 | R1 | D3 | 3 | 1 | 31 | D4 | D2 | 2 | 1 |
| 4 | R1 | D4 | 4 | 1 | 32 | D4 | D3 | 3 | 1 |
| 5 | R1 | D5 | 4 | 1 | 33 | D5 | R1 | 0 | 1 |
| 6 | R1 | D6 | 5 | 1 | 34 | D5 | D1 | 1 | 1 |
| 7 | R1 | R2 | 5 | 1 | 35 | D5 | D2 | 2 | 1 |
| 8 | D1 | R1 | 0 | 1 | 36 | D5 | D3 | 3 | 1 |
| 9 | D1 | D2 | 2 | 1 | 37 | D6 | R1 | 0 | 1 |
| 10 | D1 | D3 | 3 | 1 | 38 | D6 | D1 | 1 | 1 |
| 11 | D1 | D4 | 4 | 1 | 39 | D6 | D2 | 2 | 1 |
| 12 | D1 | D5 | 4 | 1 | 40 | D6 | D3 | 3 | 1 |
| 13 | D1 | D6 | 5 | 1 | 41 | R2 | R1 | 0 | 1 |
| 14 | D1 | R2 | 5 | 1 | 42 | R2 | D1 | 1 | 1 |
| 15 | D2 | R1 | 0 | 1 | 43 | R2 | D2 | 2 | 1 |
| 16 | D2 | D1 | 1 | 1 | 44 | R2 | D3 | 3 | 1 |
| 17 | D2 | D3 | 3 | 1 | | | | | |
| 18 | D2 | D4 | 4 | 1 | | | | | |
| 19 | D2 | D5 | 4 | 1 | | | | | |
| 20 | D2 | D6 | 5 | 1 | | | | | |
| 21 | D2 | R2 | 5 | 1 | | | | | |
| 22 | D3 | R1 | 0 | 1 | | | | | |
| 23 | D3 | D1 | 1 | 1 | | | | | |
| 24 | D3 | D2 | 2 | 1 | | | | | |
| 25 | D3 | D4 | 4 | 1 | | | | | |
| 26 | D3 | D5 | 4 | 1 | | | | | |
| 27 | D3 | D6 | 5 | 1 | | | | | |
| 28 | D3 | R2 | 5 | 1 | | | | | |

Fig. 10A

ROUTING TABLE 1216A
(PCIe SWITCH A (DEVICES D5, D6 ARE NOT INSTALLED))

| | A1 | A2 | A3 | A4 | A5 |
|---|---|---|---|---|---|
| ENTRY | TRANSMISSION SOURCE | TRANSMISSION DESTINATION | PORT NUMBER | ENABLE FLAG | |
| 1 | R1 | D1 | 1 | 1 |
| 2 | R1 | D2 | 2 | 1 |
| 3 | R1 | D3 | 3 | 1 |
| 4 | R1 | D4 | 4 | 1 |
| 5 | R1 | D5 | 4 | 0 |
| 6 | R1 | D6 | 5 | 0 |
| 7 | R1 | R2 | 5 | 1 |
| 8 | D1 | R1 | 0 | 1 |
| 9 | D1 | D2 | 2 | 1 |
| 10 | D1 | D3 | 3 | 1 |
| 11 | D1 | D4 | 4 | 1 |
| 12 | D1 | D5 | 4 | 0 |
| 13 | D1 | D6 | 5 | 0 |
| 14 | D1 | R2 | 5 | 1 |
| 15 | D2 | R1 | 0 | 1 |
| 16 | D2 | D1 | 1 | 1 |
| 17 | D2 | D3 | 3 | 1 |
| 18 | D2 | D4 | 4 | 1 |
| 19 | D2 | D5 | 4 | 0 |
| 20 | D2 | D6 | 5 | 0 |
| 21 | D2 | R2 | 5 | 1 |
| 22 | D3 | R1 | 0 | 1 |
| 23 | D3 | D1 | 1 | 1 |
| 24 | D3 | D2 | 2 | 1 |
| 25 | D3 | D4 | 4 | 1 |
| 26 | D3 | D5 | 4 | 0 |
| 27 | D3 | D6 | 5 | 0 |
| 28 | D3 | R2 | 5 | 1 |
| 29 | D4 | R1 | 0 | 1 |
| 30 | D4 | D1 | 1 | 1 |
| 31 | D4 | D2 | 2 | 1 |
| 32 | D4 | D3 | 3 | 1 |
| 33 | D5 | R1 | 0 | 0 |
| 34 | D5 | D1 | 1 | 0 |
| 35 | D5 | D2 | 2 | 0 |
| 36 | D5 | D3 | 3 | 0 |
| 37 | D6 | R1 | 0 | 0 |
| 38 | D6 | D1 | 1 | 0 |
| 39 | D6 | D2 | 2 | 0 |
| 40 | D6 | D3 | 3 | 0 |
| 41 | R2 | R1 | 0 | 1 |
| 42 | R2 | D1 | 1 | 1 |
| 43 | R2 | D2 | 2 | 1 |
| 44 | R2 | D3 | 3 | 1 |

Fig. 10B

ROUTING TABLE 1216B
(PCIe SWITCH B (DEVICES D5, D6 ARE NOT INSTALLED))

| ENTRY | TRANSMISSION SOURCE | TRANSMISSION DESTINATION | PORT NUMBER | ENABLE FLAG |
|---|---|---|---|---|
| 1 | R1 | D4 | 1 | 1 |
| 2 | R1 | D5 | 2 | 0 |
| 3 | R1 | D6 | 3 | 0 |
| 4 | R1 | R2 | 0 | 1 |
| 5 | D1 | D4 | 1 | 1 |
| 6 | D1 | D5 | 2 | 0 |
| 7 | D1 | D6 | 3 | 0 |
| 8 | D1 | R2 | 0 | 1 |
| 9 | D2 | D4 | 1 | 1 |
| 10 | D2 | D5 | 2 | 0 |
| 11 | D2 | D6 | 3 | 0 |
| 12 | D2 | R2 | 0 | 1 |
| 13 | D3 | D4 | 1 | 1 |
| 14 | D3 | D5 | 2 | 0 |
| 15 | D3 | D6 | 3 | 0 |
| 16 | D3 | R2 | 0 | 1 |
| 17 | D4 | R1 | 4 | 1 |
| 18 | D4 | D1 | 4 | 1 |
| 19 | D4 | D2 | 4 | 1 |
| 20 | D4 | D3 | 4 | 1 |
| 21 | D4 | D5 | 2 | 0 |
| 22 | D4 | D6 | 3 | 0 |
| 23 | D4 | R2 | 0 | 1 |
| 24 | D5 | R1 | 4 | 0 |
| 25 | D5 | D1 | 4 | 0 |
| 26 | D5 | D2 | 4 | 0 |
| 27 | D5 | D3 | 4 | 0 |
| 28 | D5 | D4 | 1 | 0 |
| 29 | D5 | D6 | 3 | 0 |
| 30 | D5 | R2 | 0 | 0 |
| 31 | D6 | R1 | 5 | 0 |
| 32 | D6 | D1 | 5 | 0 |
| 33 | D6 | D2 | 5 | 0 |
| 34 | D6 | D3 | 5 | 0 |
| 35 | D6 | D4 | 2 | 0 |
| 36 | D6 | D5 | 3 | 0 |
| 37 | D6 | R2 | 0 | 0 |
| 38 | R2 | R1 | 5 | 1 |
| 39 | R2 | D1 | 5 | 1 |
| 40 | R2 | D2 | 5 | 1 |
| 41 | R2 | D3 | 5 | 1 |
| 42 | R2 | D4 | 1 | 1 |
| 43 | R2 | D5 | 2 | 0 |
| 44 | R2 | D6 | 3 | 0 |

Fig. 12A

ROUTING TABLE 1216A
(PCIe SWITCH A)

| ENTRY | TRANSMISSION SOURCE | TRANSMISSION DESTINATION | PORT NUMBER | ENABLE FLAG | ENTRY | TRANSMISSION SOURCE | TRANSMISSION DESTINATION | PORT NUMBER | ENABLE FLAG |
|---|---|---|---|---|---|---|---|---|---|
| 1 | R1 | D1 | 1 | 1 | 29 | D4 | R1 | 0 | 1 |
| 2 | R1 | D2 | 2 | 1 | 30 | D4 | D1 | 1 | 1 |
| 3 | R1 | D3 | 3 | 0 | 31 | D4 | D2 | 2 | 1 |
| 4 | R1 | D4 | 4 | 1 | 32 | D4 | D3 | 3 | 0 |
| 5 | R1 | D5 | 4 | 1 | 33 | D5 | R1 | 0 | 1 |
| 6 | R1 | D6 | 5 | 1 | 34 | D5 | D1 | 1 | 1 |
| 7 | R1 | R2 | 5 | 1 | 35 | D5 | D2 | 2 | 1 |
| 8 | D1 | R1 | 0 | 1 | 36 | D5 | D3 | 3 | 0 |
| 9 | D1 | D2 | 2 | 1 | 37 | D6 | R1 | 0 | 1 |
| 10 | D1 | D3 | 3 | 0 | 38 | D6 | D1 | 1 | 1 |
| 11 | D1 | D4 | 4 | 1 | 39 | D6 | D2 | 2 | 1 |
| 12 | D1 | D5 | 4 | 1 | 40 | D6 | D3 | 3 | 0 |
| 13 | D1 | D6 | 5 | 1 | 41 | R2 | R1 | 0 | 1 |
| 14 | D1 | R2 | 5 | 1 | 42 | R2 | D1 | 1 | 1 |
| 15 | D2 | R1 | 0 | 1 | 43 | R2 | D2 | 2 | 1 |
| 16 | D2 | D1 | 1 | 1 | 44 | R2 | D3 | 3 | 0 |
| 17 | D2 | D3 | 3 | 0 | | | | | |
| 18 | D2 | D4 | 4 | 1 | | | | | |
| 19 | D2 | D5 | 4 | 1 | | | | | |
| 20 | D2 | D6 | 5 | 1 | | | | | |
| 21 | D2 | R2 | 5 | 1 | | | | | |
| 22 | D3 | R1 | 0 | 0 | | | | | |
| 23 | D3 | D1 | 1 | 0 | | | | | |
| 24 | D3 | D2 | 2 | 0 | | | | | |
| 25 | D3 | D4 | 4 | 0 | | | | | |
| 26 | D3 | D5 | 4 | 0 | | | | | |
| 27 | D3 | D6 | 5 | 0 | | | | | |
| 28 | D3 | R2 | 5 | 0 | | | | | |

Fig. 12B

ROUTING TABLE 1216B
(PCIe SWITCH B)

| | B1 | B2 | B3 | B4 | B5 |
|---|---|---|---|---|---|
| ENTRY | TRANSMISSION SOURCE | TRANSMISSION DESTINATION | PORT NUMBER | ENABLE FLAG |
| 1 | R1 | D4 | 1 | 1 |
| 2 | R1 | D5 | 2 | 1 |
| 3 | R1 | D6 | 3 | 1 |
| 4 | R1 | R2 | 0 | 1 |
| 5 | D1 | D4 | 1 | 1 |
| 6 | D1 | D5 | 2 | 1 |
| 7 | D1 | D6 | 3 | 1 |
| 8 | D1 | R2 | 0 | 1 |
| 9 | D2 | D4 | 1 | 1 |
| 10 | D2 | D5 | 2 | 1 |
| 11 | D2 | D6 | 3 | 1 |
| 12 | D2 | R2 | 0 | 1 |
| 13 | D3 | D4 | 1 | 0 |
| 14 | D3 | D5 | 2 | 0 |
| 15 | D3 | D6 | 3 | 0 |
| 16 | D3 | R2 | 0 | 0 |
| 17 | D4 | R1 | 4 | 1 |
| 18 | D4 | D1 | 4 | 1 |
| 19 | D4 | D2 | 4 | 1 |
| 20 | D4 | D3 | 4 | 0 |
| 21 | D4 | D5 | 2 | 1 |
| 22 | D4 | D6 | 3 | 1 |
| 23 | D4 | R2 | 0 | 1 |
| 24 | D5 | R1 | 4 | 1 |
| 25 | D5 | D1 | 4 | 1 |
| 26 | D5 | D2 | 4 | 1 |
| 27 | D5 | D3 | 4 | 0 |
| 28 | D5 | D4 | 1 | 1 |

| | B1 | B2 | B3 | B4 | B5 |
|---|---|---|---|---|---|
| ENTRY | TRANSMISSION SOURCE | TRANSMISSION DESTINATION | PORT NUMBER | ENABLE FLAG |
| 29 | D5 | D6 | 3 | 1 |
| 30 | D5 | R2 | 0 | 1 |
| 31 | D6 | R1 | 5 | 1 |
| 32 | D6 | D1 | 5 | 1 |
| 33 | D6 | D2 | 5 | 1 |
| 34 | D6 | D3 | 5 | 0 |
| 35 | D6 | D4 | 2 | 1 |
| 36 | D6 | D5 | 3 | 1 |
| 37 | D6 | R2 | 0 | 1 |
| 38 | R2 | R1 | 5 | 1 |
| 39 | R2 | D1 | 5 | 1 |
| 40 | R2 | D2 | 5 | 1 |
| 41 | R2 | D3 | 5 | 0 |
| 42 | R2 | D4 | 1 | 1 |
| 43 | R2 | D5 | 2 | 1 |
| 44 | R2 | D6 | 3 | 1 |

Fig. 15A

ROUTING TABLE 1216A
(PCIe SWITCH A (DEVICE D5 IS ADDITIONALLY INSTALLED
AND DEVICE D6 IS NOT INSTALLED))

| ENTRY | TRANSMISSION SOURCE | TRANSMISSION DESTINATION | PORT NUMBER | ENABLE FLAG |
|---|---|---|---|---|
| 1 | R1 | D1 | 1 | 1 |
| 2 | R1 | D2 | 2 | 1 |
| 3 | R1 | D3 | 3 | 1 |
| 4 | R1 | D4 | 4 | 1 |
| 5 | R1 | D5 | 4 | 1 |
| 6 | R1 | D6 | 5 | 0 |
| 7 | R1 | R2 | 5 | 1 |
| 8 | D1 | R1 | 0 | 1 |
| 9 | D1 | D2 | 2 | 1 |
| 10 | D1 | D3 | 3 | 1 |
| 11 | D1 | D4 | 4 | 1 |
| 12 | D1 | D5 | 4 | 1 |
| 13 | D1 | D6 | 5 | 0 |
| 14 | D1 | R2 | 5 | 1 |
| 15 | D2 | R1 | 0 | 1 |
| 16 | D2 | D1 | 1 | 1 |
| 17 | D2 | D3 | 3 | 1 |
| 18 | D2 | D4 | 4 | 1 |
| 19 | D2 | D5 | 4 | 1 |
| 20 | D2 | D6 | 5 | 0 |
| 21 | D2 | R2 | 5 | 1 |
| 22 | D3 | R1 | 0 | 1 |
| 23 | D3 | D1 | 1 | 1 |
| 24 | D3 | D2 | 2 | 1 |
| 25 | D3 | D4 | 4 | 1 |
| 26 | D3 | D5 | 4 | 1 |
| 27 | D3 | D6 | 5 | 0 |
| 28 | D3 | R2 | 5 | 1 |
| 29 | D4 | R1 | 0 | 1 |
| 30 | D4 | D1 | 1 | 1 |
| 31 | D4 | D2 | 2 | 1 |
| 32 | D4 | D3 | 3 | 1 |
| 33 | D5 | R1 | 0 | 1 |
| 34 | D5 | D1 | 1 | 1 |
| 35 | D5 | D2 | 2 | 1 |
| 36 | D5 | D3 | 3 | 1 |
| 37 | D6 | R1 | 0 | 0 |
| 38 | D6 | D1 | 1 | 0 |
| 39 | D6 | D2 | 2 | 0 |
| 40 | D6 | D3 | 3 | 0 |
| 41 | R2 | R1 | 0 | 1 |
| 42 | R2 | D1 | 1 | 1 |
| 43 | R2 | D2 | 2 | 1 |
| 44 | R2 | D3 | 3 | 1 |

Fig. 15B

ROUTING TABLE 1216B
(PCIe SWITCH B (DEVICE D5 IS ADDITIONALLY INSTALLED
AND DEVICE D6 IS NOT INSTALLED))

| ENTRY | TRANSMISSION SOURCE | TRANSMISSION DESTINATION | PORT NUMBER | ENABLE FLAG |
|---|---|---|---|---|
| 1 | R1 | D4 | 1 | 1 |
| 2 | R1 | D5 | 2 | 1 |
| 3 | R1 | D6 | 3 | 0 |
| 4 | R1 | R2 | 0 | 1 |
| 5 | D1 | D4 | 1 | 1 |
| 6 | D1 | D5 | 2 | 1 |
| 7 | D1 | D6 | 3 | 0 |
| 8 | D1 | R2 | 0 | 1 |
| 9 | D2 | D4 | 1 | 1 |
| 10 | D2 | D5 | 2 | 1 |
| 11 | D2 | D6 | 3 | 0 |
| 12 | D2 | R2 | 0 | 1 |
| 13 | D3 | D4 | 1 | 1 |
| 14 | D3 | D5 | 2 | 1 |
| 15 | D3 | D6 | 3 | 0 |
| 16 | D3 | R2 | 0 | 1 |
| 17 | D4 | R1 | 4 | 1 |
| 18 | D4 | D1 | 4 | 1 |
| 19 | D4 | D2 | 4 | 1 |
| 20 | D4 | D3 | 4 | 1 |
| 21 | D4 | D5 | 2 | 1 |
| 22 | D4 | D6 | 3 | 0 |
| 23 | D4 | R2 | 0 | 1 |
| 24 | D5 | R1 | 4 | 1 |
| 25 | D5 | D1 | 4 | 1 |
| 26 | D5 | D2 | 4 | 1 |
| 27 | D5 | D3 | 4 | 1 |
| 28 | D5 | D4 | 1 | 1 |
| 29 | D5 | D6 | 3 | 1 |
| 30 | D5 | R2 | 0 | 1 |
| 31 | D6 | R1 | 5 | 0 |
| 32 | D6 | D1 | 5 | 0 |
| 33 | D6 | D2 | 5 | 0 |
| 34 | D6 | D3 | 5 | 0 |
| 35 | D6 | D4 | 2 | 0 |
| 36 | D6 | D5 | 3 | 0 |
| 37 | D6 | R2 | 0 | 0 |
| 38 | R2 | R1 | 5 | 1 |
| 39 | R2 | D1 | 5 | 1 |
| 40 | R2 | D2 | 5 | 1 |
| 41 | R2 | D3 | 5 | 1 |
| 42 | R2 | D4 | 1 | 1 |
| 43 | R2 | D5 | 2 | 1 |
| 44 | R2 | D6 | 3 | 0 |

Fig. 18A

ROUTING TABLE 1216A
(CASE WHERE FAILURE OCCURS IN PATH BETWEEN PORTS 5)

| ENTRY | TRANSMISSION SOURCE | TRANSMISSION DESTINATION | PORT NUMBER | ENABLE FLAG | ENTRY | TRANSMISSION SOURCE | TRANSMISSION DESTINATION | PORT NUMBER | ENABLE FLAG |
|---|---|---|---|---|---|---|---|---|---|
| 1 | R1 | D1 | 1 | 1 | 29 | D4 | R1 | 0 | 1 |
| 2 | R1 | D2 | 2 | 1 | 30 | D4 | D1 | 1 | 1 |
| 3 | R1 | D3 | 3 | 1 | 31 | D4 | D2 | 2 | 1 |
| 4 | R1 | D4 | 4 | 1 | 32 | D4 | D3 | 3 | 1 |
| 5 | R1 | D5 | 4 | 1 | 33 | D5 | R1 | 0 | 1 |
| 6 | R1 | D6 | 5→4 | 1 | 34 | D5 | D1 | 1 | 1 |
| 7 | R1 | R2 | 5→4 | 1 | 35 | D5 | D2 | 2 | 1 |
| 8 | D1 | R1 | 0 | 1 | 36 | D5 | D3 | 3 | 1 |
| 9 | D1 | D2 | 2 | 1 | 37 | D6 | R1 | 0 | 1 |
| 10 | D1 | D3 | 3 | 1 | 38 | D6 | D1 | 1 | 1 |
| 11 | D1 | D4 | 4 | 1 | 39 | D6 | D2 | 2 | 1 |
| 12 | D1 | D5 | 4 | 1 | 40 | D6 | D3 | 3 | 1 |
| 13 | D1 | D6 | 5→4 | 1 | 41 | R2 | R1 | 0 | 1 |
| 14 | D1 | R2 | 5→4 | 1 | 42 | R2 | D1 | 1 | 1 |
| 15 | D2 | R1 | 0 | 1 | 43 | R2 | D2 | 2 | 1 |
| 16 | D2 | D1 | 1 | 1 | 44 | R2 | D3 | 3 | 1 |
| 17 | D2 | D3 | 3 | 1 | | | | | |
| 18 | D2 | D4 | 4 | 1 | | | | | |
| 19 | D2 | D5 | 4 | 1 | | | | | |
| 20 | D2 | D6 | 5→4 | 1 | | | | | |
| 21 | D2 | R2 | 5→4 | 1 | | | | | |
| 22 | D3 | R1 | 0 | 1 | | | | | |
| 23 | D3 | D1 | 1 | 1 | | | | | |
| 24 | D3 | D2 | 2 | 1 | | | | | |
| 25 | D3 | D4 | 4 | 1 | | | | | |
| 26 | D3 | D5 | 4 | 1 | | | | | |
| 27 | D3 | D6 | 5→4 | 1 | | | | | |
| 28 | D3 | R2 | 5→4 | 1 | | | | | |

ROUTING TABLE 1216B
(CASE WHERE FAILURE OCCURS IN PATH BETWEEN PORTS 5)

| ENTRY | TRANSMISSION SOURCE | TRANSMISSION DESTINATION | PORT NUMBER | ENABLE FLAG |
|---|---|---|---|---|
| 1 | R1 | D4 | 1 | 1 |
| 2 | R1 | D5 | 2 | 1 |
| 3 | R1 | D6 | 3 | 1 |
| 4 | R1 | R2 | 0 | 1 |
| 5 | D1 | D4 | 1 | 1 |
| 6 | D1 | D5 | 2 | 1 |
| 7 | D1 | D6 | 3 | 1 |
| 8 | D1 | R2 | 0 | 1 |
| 9 | D2 | D4 | 1 | 1 |
| 10 | D2 | D5 | 2 | 1 |
| 11 | D2 | D6 | 3 | 1 |
| 12 | D2 | R2 | 0 | 1 |
| 13 | D3 | D4 | 1 | 1 |
| 14 | D3 | D5 | 2 | 1 |
| 15 | D3 | D6 | 3 | 1 |
| 16 | D3 | R2 | 0 | 1 |
| 17 | D4 | R1 | 4 | 1 |
| 18 | D4 | D1 | 4 | 1 |
| 19 | D4 | D2 | 4 | 1 |
| 20 | D4 | D3 | 4 | 1 |
| 21 | D4 | D5 | 2 | 1 |
| 22 | D4 | D6 | 3 | 1 |
| 23 | D4 | R2 | 0 | 1 |
| 24 | D5 | R1 | 4 | 1 |
| 25 | D5 | D1 | 4 | 1 |
| 26 | D5 | D2 | 4 | 1 |
| 27 | D5 | D3 | 4 | 1 |
| 28 | D5 | D4 | 1 | 1 |

| ENTRY | TRANSMISSION SOURCE | TRANSMISSION DESTINATION | PORT NUMBER | ENABLE FLAG |
|---|---|---|---|---|
| 29 | D5 | D6 | 3 | 1 |
| 30 | D5 | R2 | 0 | 1 |
| 31 | D6 | R1 | 5→4 | 1 |
| 32 | D6 | D1 | 5→4 | 1 |
| 33 | D6 | D2 | 5→4 | 1 |
| 34 | D6 | D3 | 5→4 | 1 |
| 35 | D6 | D4 | 2 | 1 |
| 36 | D6 | D5 | 3 | 1 |
| 37 | D6 | R2 | 0 | 1 |
| 38 | R2 | R1 | 5→4 | 1 |
| 39 | R2 | D1 | 5→4 | 1 |
| 40 | R2 | D2 | 5→4 | 1 |
| 41 | R2 | D3 | 5→4 | 1 |
| 42 | R2 | D4 | 1 | 1 |
| 43 | R2 | D5 | 2 | 1 |
| 44 | R2 | D6 | 3 | 0 |

FAILED PATH ALTERNATE PROCESSING

READ OPERATION IN NORMAL STATUS

READ OPERATION IN CASE WHERE
FAILURE OCCURS (CONVENTIONALLY)

READ OPERATION IN CASE WHERE FAILURE
OCCURS (IN THE PRESENT EMBODIMENT)

Fig. 21

EXEMPLARY CONFIGURATION OF READ REQUEST DATA
TRANSMITTED FROM DEVICE X TO DEVICE Y

| READ REQUEST | TRANSMISSION SOURCE ID=X | TRANSMISSION DESTINATION ID=Y | DATA |
|---|---|---|---|

EXEMPLARY CONFIGURATION OF COMPLETION NOTIFICATION DATA
TRANSMITTED FROM PCIe SWITCH TO DEVICE X

| COMPLETION NOTIFICATION | TRANSMISSION SOURCE ID=Y | TRANSMISSION DESTINATION ID=X | ERROR LOG |
|---|---|---|---|

Fig. 23A

ROUTING TABLE 1216A
(WITH ALTERNATE PORT NUMBERS)

| ENTRY | TRANSMISSION SOURCE | TRANSMISSION DESTINATION | PORT NUMBER | ALTERNATE PORT NUMBER | ENABLE FLAG | ENTRY | TRANSMISSION SOURCE | TRANSMISSION DESTINATION | PORT NUMBER | ALTERNATE PORT NUMBER | ENABLE FLAG |
|---|---|---|---|---|---|---|---|---|---|---|---|
| 1 | R1 | D1 | 1 |  | 1 | 29 | D4 | R1 | 0 |  | 1 |
| 2 | R1 | D2 | 2 |  | 1 | 30 | D4 | D1 | 1 |  | 1 |
| 3 | R1 | D3 | 3 |  | 1 | 31 | D4 | D2 | 2 |  | 1 |
| 4 | R1 | D4 | 4 | 5 | 1 | 32 | D4 | D3 | 3 |  | 1 |
| 5 | R1 | D5 | 4 | 5 | 1 | 33 | D5 | R1 | 0 |  | 1 |
| 6 | R1 | D6 | 5 | 4 | 0 | 34 | D5 | D1 | 1 |  | 1 |
| 7 | R1 | R2 | 5 | 4 | 1 | 35 | D5 | D2 | 2 |  | 1 |
| 8 | D1 | R1 | 0 |  | 1 | 36 | D5 | D3 | 3 |  | 1 |
| 9 | D1 | D2 | 2 |  | 1 | 37 | D6 | R1 | 0 |  | 0 |
| 10 | D1 | D3 | 3 |  | 1 | 38 | D6 | D1 | 1 |  | 0 |
| 11 | D1 | D4 | 4 | 5 | 1 | 39 | D6 | D2 | 2 |  | 0 |
| 12 | D1 | D5 | 4 | 5 | 1 | 40 | D6 | D3 | 3 |  | 0 |
| 13 | D1 | D6 | 5 | 4 | 0 | 41 | R2 | R1 | 0 |  | 1 |
| 14 | D1 | R2 | 5 | 4 | 1 | 42 | R2 | D1 | 1 |  | 1 |
| 15 | D2 | R1 | 0 |  | 1 | 43 | R2 | D2 | 2 |  | 1 |
| 16 | D2 | D1 | 1 |  | 1 | 44 | R2 | D3 | 3 |  | 1 |
| 17 | D2 | D3 | 3 |  | 1 | | | | | | |
| 18 | D2 | D4 | 4 | 5 | 1 | | | | | | |
| 19 | D2 | D5 | 4 | 5 | 1 | | | | | | |
| 20 | D2 | D6 | 5 | 4 | 0 | | | | | | |
| 21 | D2 | R2 | 5 | 4 | 1 | | | | | | |
| 22 | D3 | R1 | 0 |  | 1 | | | | | | |
| 23 | D3 | D1 | 1 |  | 1 | | | | | | |
| 24 | D3 | D2 | 2 |  | 1 | | | | | | |
| 25 | D3 | D4 | 4 | 5 | 1 | | | | | | |
| 26 | D3 | D5 | 4 | 5 | 1 | | | | | | |
| 27 | D3 | D6 | 5 | 4 | 0 | | | | | | |
| 28 | D3 | R2 | 5 | 4 | 1 | | | | | | |

Fig. 23B

ROUTING TABLE 1216B
(WITH ALTERNATE PORT NUMBERS)

| ENTRY | TRANSMISSION SOURCE | TRANSMISSION DESTINATION | PORT NUMBER | ALTERNATE PORT NUMBER | ENABLE FLAG |
|---|---|---|---|---|---|
| 1 | R1 | D4 | 1 |  | 1 |
| 2 | R1 | D5 | 2 |  | 1 |
| 3 | R1 | D6 | 3 |  | 0 |
| 4 | R1 | R2 | 0 |  | 1 |
| 5 | D1 | D4 | 1 |  | 1 |
| 6 | D1 | D5 | 2 |  | 1 |
| 7 | D1 | D6 | 3 |  | 0 |
| 8 | D1 | R2 | 0 |  | 1 |
| 9 | D2 | D4 | 1 |  | 1 |
| 10 | D2 | D5 | 2 |  | 1 |
| 11 | D2 | D6 | 3 |  | 0 |
| 12 | D2 | R2 | 0 |  | 1 |
| 13 | D3 | D4 | 1 |  | 1 |
| 14 | D3 | D5 | 2 |  | 1 |
| 15 | D3 | D6 | 3 |  | 0 |
| 16 | D3 | R2 | 0 |  | 1 |
| 17 | D4 | R1 | 4 | 5 | 1 |
| 18 | D4 | D1 | 4 | 5 | 1 |
| 19 | D4 | D2 | 4 | 5 | 1 |
| 20 | D4 | D3 | 4 | 5 | 1 |
| 21 | D4 | D5 | 2 |  | 1 |
| 22 | D4 | D6 | 3 |  | 0 |
| 23 | D4 | R2 | 0 |  | 1 |
| 24 | D5 | R1 | 4 | 5 | 1 |
| 25 | D5 | D1 | 4 | 5 | 1 |
| 26 | D5 | D2 | 4 | 5 | 1 |
| 27 | D5 | D3 | 4 | 5 | 1 |
| 28 | D5 | D4 | 1 |  | 1 |
| 29 | D5 | D6 | 3 |  | 1 |
| 30 | D5 | R2 | 0 |  | 1 |
| 31 | D6 | R1 | 5 | 4 | 0 |
| 32 | D6 | D1 | 5 | 4 | 0 |
| 33 | D6 | D2 | 5 | 4 | 0 |
| 34 | D6 | D3 | 5 | 4 | 0 |
| 35 | D6 | D4 | 2 |  | 0 |
| 36 | D6 | D5 | 3 |  | 0 |
| 37 | D6 | R2 | 0 |  | 0 |
| 38 | R2 | R1 | 5 | 4 | 1 |
| 39 | R2 | D1 | 5 | 4 | 1 |
| 40 | R2 | D2 | 5 | 4 | 1 |
| 41 | R2 | D3 | 5 | 4 | 1 |
| 42 | R2 | D4 | 1 |  | 1 |
| 43 | R2 | D5 | 2 |  | 1 |
| 44 | R2 | D6 | 3 |  | 0 |

INFORMATION PROCESSING APPARATUS AND DATA TRANSFER METHOD

TECHNICAL FIELD

This invention relates to an information processing apparatus and a data transfer method, specifically to a technology for improving the availability as a system while improving the reliability of a data transfer path.

BACKGROUND ART

Storage apparatuses which provide large-scale data storage areas by using magnetic recording media such as a large number of hard disk drives (Hard Disk Drives, hereinafter referred to as "HDDs") are becoming widely utilized. As the data storage area expands, the capacity of each file data and the like to be stored therein also increases, and there arises a demand for the data transfer path used for data I/O to demonstrate high data transfer performance.

In this type of storage apparatus, the data I/O processing between a host computer utilizing the storage apparatus and storage media such as HDDs in the storage apparatus, that is, the processing of data write requests and data read requests from the host is performed by a storage control device (hereinafter referred to as a disk controller (DisK Controller, DKC) as conventionally used) and, to the data transfer inside the DKC and between this DKC and a channel adapter (CHannel Adapter, CHA) which performs communication control between the DKC and the host, or between the DKC and a disk adapter (DisK Adapter, DKA) which performs the communication control between the DKC and the recording media such as HDDs, in place of the conventional parallel transfer method such as, for example, PCI (Peripheral Component Interconnect) bus, the serial transfer method represented by, for example, PCI Express (registered trademark, hereinafter referred to as "PCIe") is being adopted. This is due to the occurrence of technical problems such as that the control of signal synchronizing timing by the conventional parallel transfer method is difficult, and the like because of demand for high speed data transfer.

When adopting a data transfer path by PCIe to the storage apparatus, ensuring the reliability and the availability as a storage apparatus becomes a problem. For example, Patent Literature (PTL) 1 discloses a configuration where, in the PCIe communication system, even if a failure occurs to a route complex coupled among multiple endpoints via a PCIe switch in a tree structure and a change of the routing information is made in the PCIe switch, a response can be returned to the data transmission source before the change.

CITATION LIST

Patent Literature

PTL 1: Japanese Patent Application Laid-open Publication No. 2007-316755

SUMMARY OF INVENTION

Technical Problem

As described above, a tree-structure topology is applied to the PCIe, and the type of hardware connection where a data transfer path (path) configures a loop among nodes is not allowed. This limitation is explicitly specified by PCI Express Base Specification Revision 2.0 which is a technical standard of PCIe established by PCI-SIG (registered trademark, The Peripheral Component Interconnect Special Interest Group) (for example, refer to 1.3 PCI Express Fabric Topology). This topological limitation also applies to the above-mentioned PTL 1. Note that the contents of the above-mentioned document, PCI Express Base Specification Revision 2.0, are incorporated herein by reference.

Meanwhile, in the storage control device, for achieving both the reliability and the availability of data transfer in a compatible manner, a duplex configuration, in terms of hardware, is adopted to a path where data transfer is performed. Therefore, for applying PCIe to data transfer, for example, in a case an alternate path is set among PCIe switches included in different branches configuring a tree structure which can be used when a failure occurs to any of the PCIe switches, duplication of the data transfer path is required.

However, if this type of hardware configuration is applied, a loop which is not allowed by the technical standard of PCIe is configured between the two PCIe switches, and therefore, PCIe cannot be applied as it is to this type of hardware configuration.

The present invention has been conceived in view of the above background, and the main objective thereof is to provide an information processing apparatus and a data transfer method capable of improving the availability as a system while improving the reliability of a data transfer path.

Solution to Problem

An aspect of this invention for achieving the above-mentioned objective is an information processing apparatus including a data transfer path branching in a tree structure, from a root node to a plurality of nodes while communicably coupling therebetween and transmitting serial data between the root node and the plurality of nodes, comprising two internode data transfer paths provided between at least a pair of nodes of the plurality of nodes, through which serial data transfer is performed, and a routing processing unit provided to each terminal nodes that are the nodes on both ends of the internode data transfer path, transferring the return data from the transmission destination node to the transmission source node by using the same internode data transfer path as the internode data transfer path used for data transfer to the transmission destination node, when each of the terminal nodes transfers data received from any of another nodes being a transmission source to any of the nodes being a transmission destination via the other terminal node.

Other problems disclosed by the application and the solutions thereof are made apparent in the section of the embodiment of the invention and the drawings attached.

Advantageous Effects of Invention

According to the present invention, an information processing apparatus and a data transfer method capable of improving the availability as a system while improving the reliability of a data transfer path can be provided.

BRIEF DESCRIPTION OF DRAWINGS

FIG. 10A is an example of a routing table 1216A stored in the PCIe switch A in a case where the devices D5 and D6 are not installed.

FIG. 10B is an example of a routing table 1216B stored in the PCIe switch B in a case where the devices D5 and D6 are not installed.

FIG. 12A is an example of a routing table 1216A stored in the PCIe switch A in a case where a failure occurs to the device D3.

FIG. 12B is an example of a routing table 1216B stored in the PCIe switch B in a case where a failure occurs to the device D3.

FIG. 15A is an example of the routing table 1216A stored in the PCIe switch A in a case where the device D5 is additionally installed.

FIG. 15B is an example of a routing table 1216B stored in the PCIe switch B in a case where the device D5 is additionally installed.

FIG. 18A is an example of a routing table 1216A stored in the PCIe switch A in a case where a failure occurs to the path coupling the ports No. 5 of the PCIe switch.

FIG. 21 is an example of the data structure of a transaction layer packet in a response processing of FIG. 20C.

FIG. 23A is an example of the routing table 1216A including alternate port numbers, stored in the PCIe switch A.

FIG. 23B is an example of the routing table 1216B including alternate port numbers, stored in the PCIe switch B.

DESCRIPTION OF EMBODIMENTS

Configuration of Storage Apparatus 10

Figure 1:
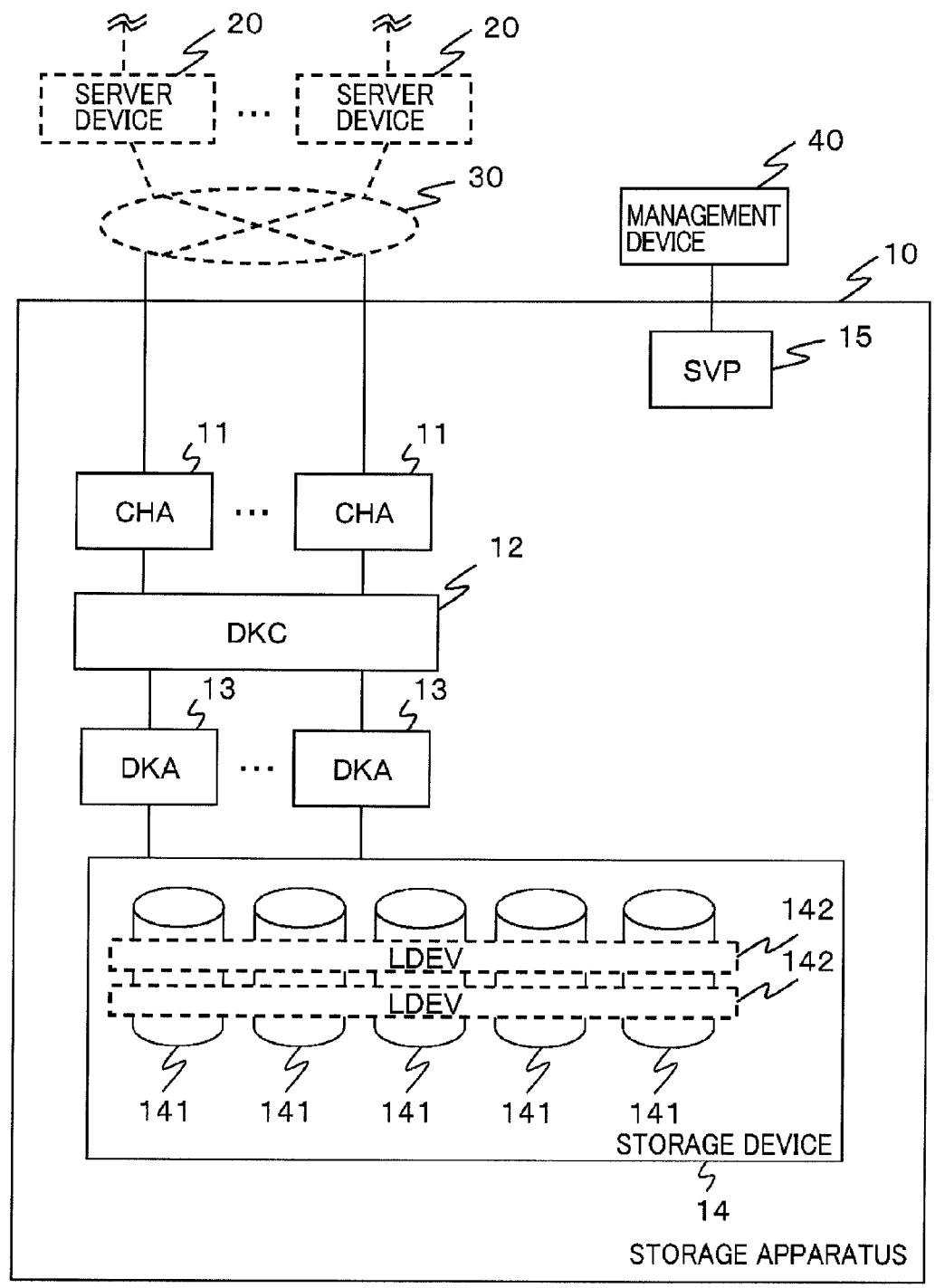
FIG. 1 is a diagram showing a schematic configuration of a storage apparatus 10.

Hereinafter, an embodiment of the present invention will be described with reference to the drawings. The schematic configuration of the storage apparatus 10 described as the embodiment is shown in FIG. 1. As shown in FIG. 1, one or more server devices 20 are coupled to the storage apparatus 10 via a communication network 30. Note that, though the example in FIG. 1 shows one storage apparatus 10, one or more other storage apparatuses 10 may be coupled to the communication network 30.

The communication network 30 is LAN (Local Area Network), WAN (Wide Area Network), SAN (Storage Area Network), the internet, a public telecommunication network, exclusive lines, and the like. The communication performed via the communication network 30 is performed according to the protocols of, for example, TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

The server device 20 is an information processing apparatus (computer) utilizing a storage area (data storage area) provided by the storage apparatus 10. The server device 20 is configured by using a personal computer, a mainframe (Mainframe), an office computer and the like. The server device 20, when accessing the above-mentioned storage area, transmits a data frame (hereinafter abbreviated as frame) including data I/O requests (data write requests, data read requests, and the like) to the storage apparatus 10.

The storage apparatus 10 is, for example, a disk array device. The storage apparatus 10 accesses the recording media in response to the above-mentioned I/O requests transmitted from the server device 20, and transmits data or a response to the server device 20. The storage apparatus 10 includes one or more channel adapters (CHannel Adapters, hereinafter abbreviated as "CHAs") 11, a disk controller (DisK Controller, hereinafter abbreviated as "DKC") 12, one or more disk adapters (DisK Adapters, hereinafter abbreviated as "DKAs") 13, a storage device 14, and a service processor (SerVice Processor, hereinafter abbreviated as "SVP") 15.

The CHA 11 receives frames transmitted from the server device 20, and transmits frames including responses of the processing for the data I/O requests (e.g. read data, a read completion report, or a write completion report) included in the received frames to the server device 20. Note that, in the description below, frames are assumed to be Fibre Channel frames (FC frames (FC: Fibre Channel)). The CHA 11 includes an external communication interface (hereinafter referred to as an "external communication I/F") having ports (communication ports) for communication with the server device 20, a processor, an internal communication interface (hereinafter referred to as an "internal communication I/F") including ports (communication ports) for communication with a local memory and the like.

The external communication I/F is configured by using NICs (Network Interface Cards), HBAs (Host Bus Adapters), and the like. The processor is configured by using a CPU (Central Processing Unit), an MPU (Micro Processing Unit), and the like. The local memory is an RAM (Random Access Memory) or an ROM (Read Only Memory). In the local memory, a microprogram is stored. By the processor reading and executing the above-mentioned microprogram from the local memory, various types of functions provided by the CHA 11 are implemented. The internal communication I/F communicates with the DKC 12 and the DKA 13 via the internal communication path. In the present embodiment, I/F, PCIe is used as this internal communication.

The DKC 12, in accordance with the above-mentioned data I/O requests included in the frames received by the CHA 11, performs processing related to data transfer performed between the CHA 11 and the DKA 13. As described later, a microprocessor (MicroProcessor, hereinafter referred to as an "MP") provided to the DKC 12 performs data (data read from the storage device 14, data written to the storage device 14) delivery between the CHA 11 and the DKA 13, staging (reading data from the storage device 14) or destaging (writing data to the storage device 14) of the data stored in the cache memory in the DKC 12, and the like.

The DKA 13 performs communication with the storage device 14 for reading data from the storage device 14 and writing data to the storage device 14. The DKA 13 includes an internal communication I/F, a processor, a local memory, and a drive interface (hereinafter referred to as a "drive I/F"). In the local memory, a microprogram is stored. Various types of functions provided by the DKA 13 are implemented by the processor reading the above-mentioned microprogram from the local memory and executing the same. The internal communication I/F communicates with the CHA 11 and the DKC 12 via the internal communication path. The processor is configured by using a CPU, an MPU, or the like. The local memory is, for example, a RAM or a ROM. The drive I/F performs communication with the storage device 14.

The storage device 14 is configured of a plurality of storage drives 141. The storage drives 141 are HDDs of, for example, SAS (Serial Attached SCSI), SATA (Serial ATA), FC (Fibre Channel), PATA (Parallel ATA), SCSI, or other types, or semi-conductor memory devices (Solid State Drives, hereinafter referred to as "SSDs").

The storage device 14 provides storage areas in units of logical storage areas provided by controlling the storage drives 141 by RAID (Redundant Array of Inexpensive (or Independent) Disks) or other methods. These logical storage areas are logical devices (LDEVs 142 (LDEV: Logical Device) configured by using, for example, RAID groups (Parity Groups). Meanwhile, the storage apparatus 10 provides to the server device 20 logical storage areas (hereinafter referred to as LUs (Logical Units, Logical Volumes) configured by using LDEVs 142. The storage apparatus 10 manages the correspondence (relation) between the LUs and the LDEVs 142 and, with reference to this correspondence, specifies the LDEVs 142 corresponding to the LUs or specifies the LUs corresponding to the LDEVs 142.

The SVP 15 controls the respective components in the storage apparatus 10 and monitors their statuses. The SVP 15 is a personal computer, an office computer, or the like. The SVP 15, by communication means such as an internal communication path, LAN or the like, communicates with the components of the storage apparatus 10 such as the CHA 11, the DKC 12, and the DKA 13 as needed, acquires operational information and others from the respective components, and provides the same to the management device 40. The SVP 15 also sets, controls, and maintains the respective components (including the installation and the update of software) based on control information and operational information transmitted from the management device 40.

The management device 40 is a computer communicably coupled to the SVP 15 via LAN or the like. The management device 40 includes a user interface using a GUI (Graphic User Interface) or a CLI (Command Line Interface) and the like for controlling and monitoring the storage apparatus 10.

Configuration of Disk Controller (DKC) 12

Figure 2:
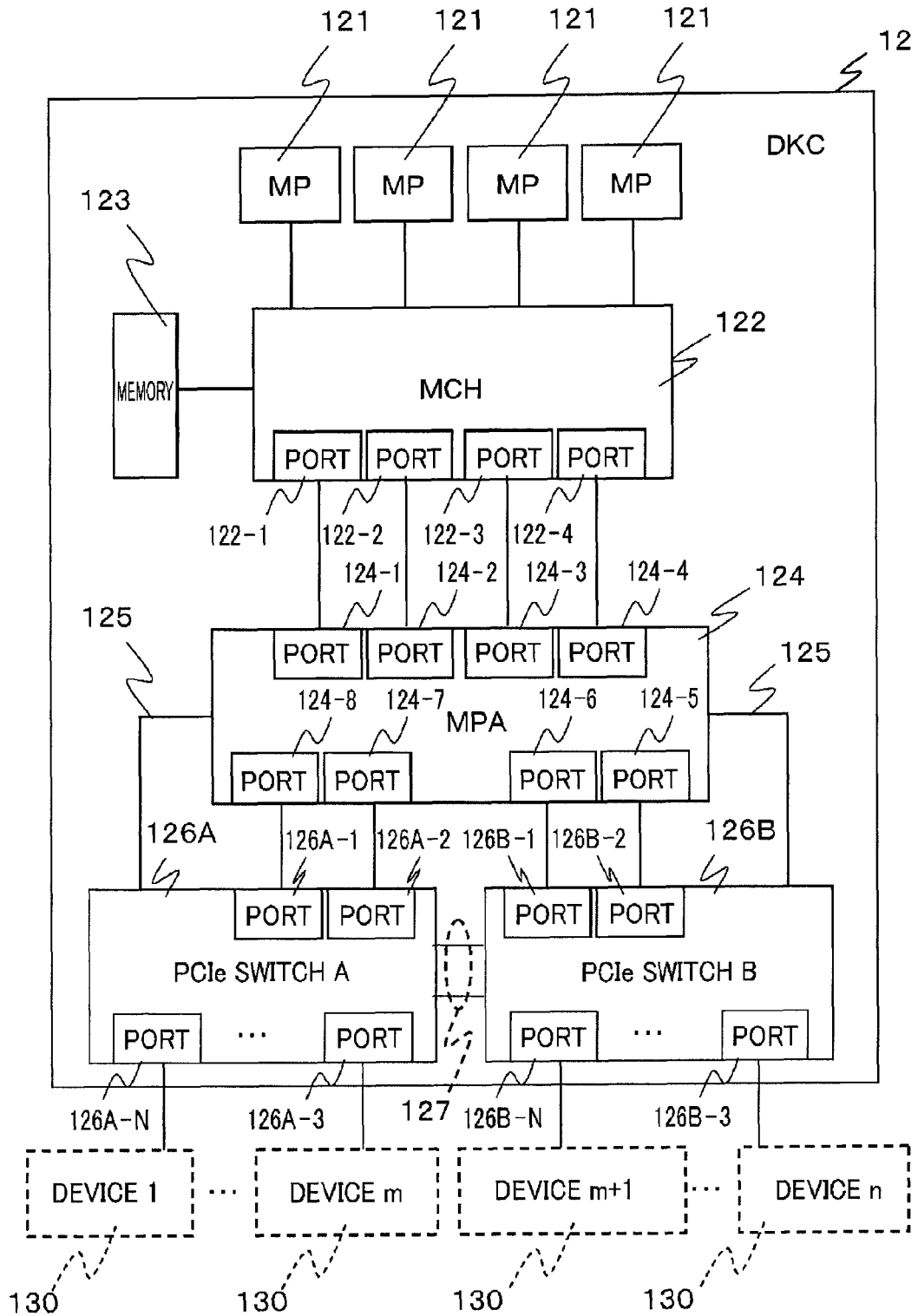
FIG. 2 is an example of a hardware configuration of a storage control device 12.

Next, with reference to FIG. 2, the hardware configuration of the DKC 12 in the present embodiment is described. FIG. 2 is a diagram showing an example of the hardware configuration of the DKC 12. The DKC 12 includes MPs (microprocessors) 121, an MCH (Memory Control Hub) 122, an MPA (MicroProcessor Adapter) 124, and PCIe switches 126A, 126B. The MPs 121, the MCH 122, the MPA 124, and the PCIe switches (terminal nodes) 126A and 126B are communicably coupled by a tree-structure data transfer path adopting the PCIe protocol. Therefore, in the DKC 12, the MPs 121 are considered to be root nodes (root complexes), and the MCH 122, the MPA 124, and the PCIe switches 126A, 126B are considered to be the nodes.

Figure 3A:
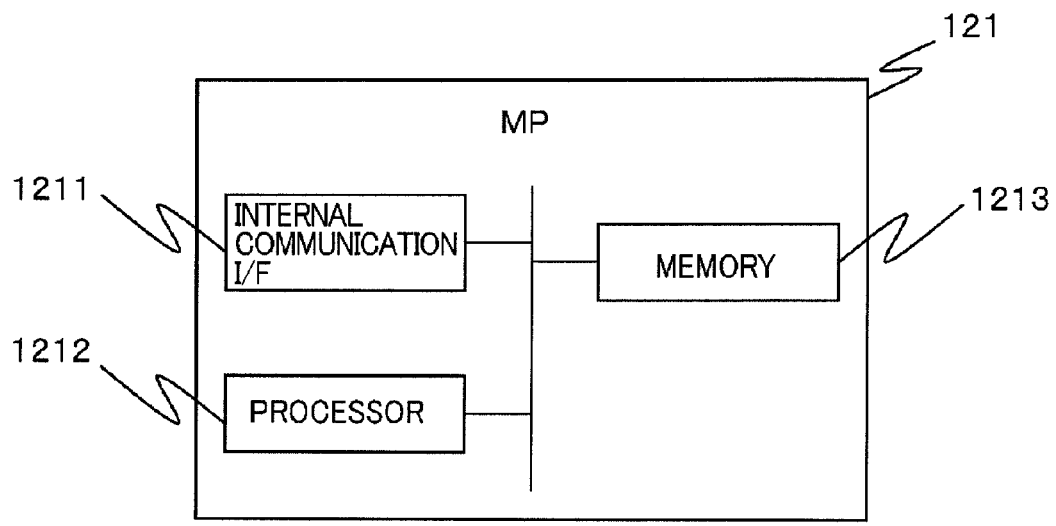
FIG. 3A is an example of a hardware configuration of a microprocessor 121.

FIG. 3A shows an example of the configuration of an MP 121. The MP 121 includes a processor 1212 configured by using a CPU, an MPU, a DMA (Direct Memory Access), or the like and, as described above, implements the main functions of the DKC 12 such as controlling the data transfer between the server device 20 and the storage device 14 via the CHA 11 and the DKA 13. Such functions are implemented through reading and executing the microprograms stored in advance in the local memory 1213 provided to each MP 121. The internal communication I/F 1211 communicates with the CHA 11, the DKA 13, and the memory 123 via the internal communication path.

Figure 3B:
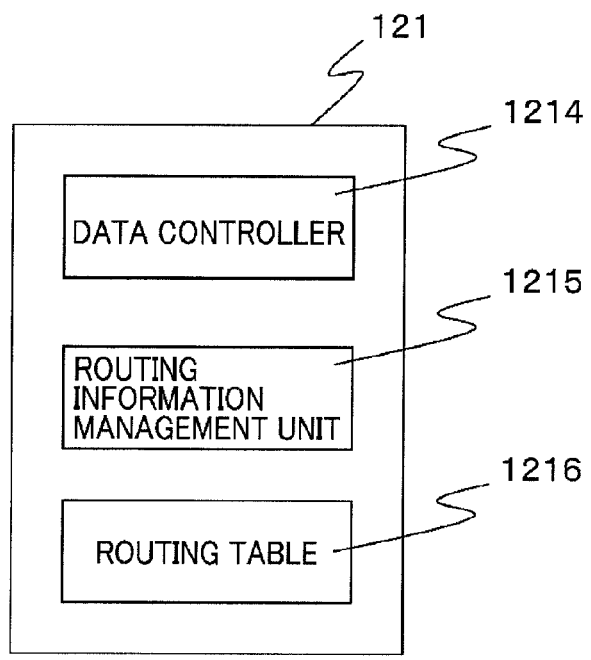
FIG. 3B is an example of a software configuration of a microprocessor 121.

FIG. 3B shows an example of the software configuration operating in the MP 121. The local memory 1213 of the MP 121 stores therein, a microprogram executed by the processor 1212 for implementing the functions of a data controller 1214, a routing information management unit 1215 and a routing table 1216 where the path which is the transfer path of data packets transferred by the PCIe protocol communication via the PCIe switches 126A, 126B described later is set. The data controller 1214 has a function of controlling the entire data processing performed in the DKC 12. The routing information management unit 1215 updates the information recorded in the routing table 1216 described later at a predetermined timing, and transfers the same to the PCIe switches 126A, 126B which are described later. The routing table 1216 is stored in the local memory 1213 of the MP 121 in advance in accordance with the configuration of the storage apparatus 10 and, when the storage apparatus 10 is initially powered on, is transferred to the respective PCIe switches 126A, 126B, where the table is used for controlling the transfer of data packets.

Note that, though four MPs 121 are installed in the DKC 12 in the example of FIG. 2, the number of MPs 121 which are installed may be any other number.

The MCH 122 comprises a bridge circuit for controlling communication between the MPs 121 and the memory 123, or among other peripheral devices such as the MPA 124. In the present embodiment, the MCH 122 includes four communication ports 122-1 to 122-4 of the PCIe protocols, and performs communication with the MPA 124.

The memory 123 is configured of a RAM or a ROM and is used as, for example, a control memory which stores programs and the like for controlling the data processing in the entire DKC 12, or as a shared memory which provides storage areas for temporarily storing the data read from the storage device 14 or the data to be written to the storage device 14.

The MPA 124 includes a function of relaying data transfer between the MPs 121 and the PCIe switches 126A, 126B and, in the example of FIG. 2, includes four communication ports 124-1 to 124-4 communicably coupled by the PCIe protocols to the communication ports 122-1 to 122-4, respectively, of the MCH 122 and four communication ports 124-5 to 124-8 communicably coupled by the PCIe protocols to the communication ports 126A-1, 126A-2 of the PCIe switch 126A and the communication ports 126B-1, 126B-2 of the PCIe switch 126B, respectively. Data I/O to the storage device 14 is transferred through these communication ports 124-1 to 124-8.

Meanwhile, the MPA 124 is communicably coupled to each of the PCIe switches 126A, 126B via the sideband communication paths 125. The sideband communication path 125 is used for transferring control data in the DKC 12 other than data I/O. The sideband communication path 125 can be configured, for example, as an appropriate serial communication path and, in the present embodiment, is used as a data transfer path for receiving data of the routing table 1216 from the MPs 121 and storing the same.

The communication ports 126A-3 to 126A-N of the PCIe switch 126A are communicably coupled by the PCIe protocols to any ones of the devices 1 to m (130), respectively. Furthermore, the communication ports 126B-3 to 126B-N of the PCIe switch 126B are similarly communicably coupled by the PCIe protocols to any of the devices m+1 to n, respectively.

The devices 1 to n are nodes just as the PCIe switches 126A, 126B and the like and respectively correspond to either the CHA 11 or the DKA 13 included in the DKC 12, specifically, the devices are PCIe transmission/reception chips existing in the communication ports of the PCIe protocol included in the CHA 11 and the DKA 13.

Meanwhile, between the PCIe switch 126A and the PCIe switch 126B inter-switch paths 127 (internode data transfer paths) which are communication paths of the PCIe protocol are installed for enabling data transfer between the device group of devices 1 to m and the device group of devices m+1 to n. As described above, in the storage apparatus 10, an obstruction of an operation just because of a failure in a path is impermissible, and therefore, as shown in FIG. 2, the inter-switch paths 127 adopt a duplex system. However, as described above, in the communication path of the PCIe protocol for which only the tree structure is originally allowed, such duplex system cannot be set. Therefore, the present embodiment proposes a configuration which enables the setting of inter-switch paths 127 of this type of duplex system.

Configuration of PCIe Switches 126

Figure 4A:
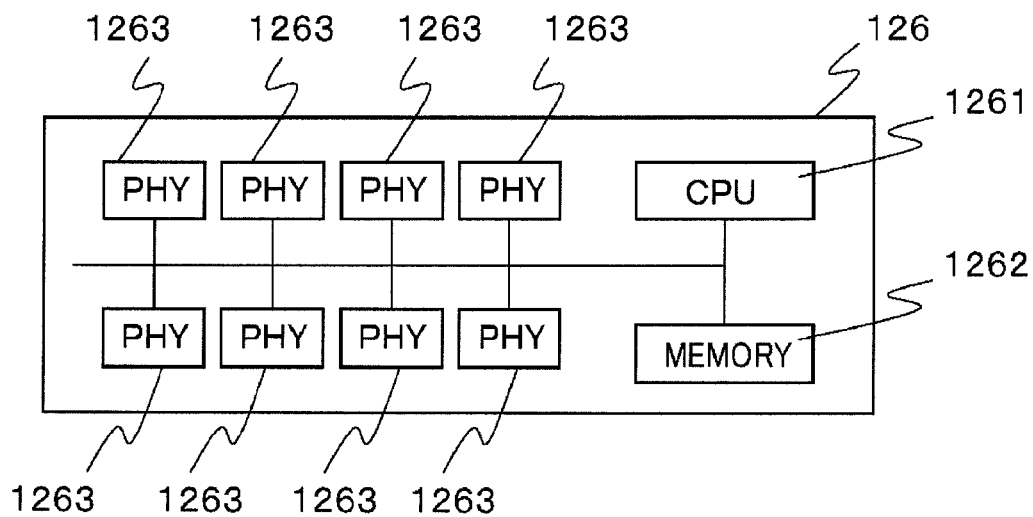
FIG. 4A is an example of the hardware configuration of a PCIe switch 126.
Figure 4B:
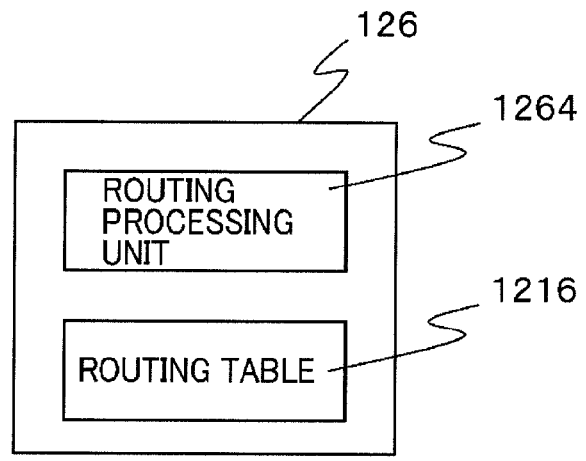
FIG. 4B is an example of the software configuration of a PCIe switch 126.

Next, the PCIe switches 126 are described. An example of a hardware configuration of a PCIe switch 126 is shown in FIG. 4A, and an example of a software configuration is shown in FIG. 4B. The PCIe switch 126 is mainly configured of a CPU 1261, a memory 1262, and PHYs 1263, and is generally provided as one ASIC (Application Specific Integrated Circuit) chip. The CPU 1261, the memory 1262, and the PHYs 1263 are communicably coupled to each other via the internal communication path.

For example, in the memory 1262 configured as a non-volatile memory such as a flash memory and the like, microprograms for implementing the main functions of the PCIe switch 126, such as controlling the transfer of PCIe data packets, are stored, and the CPU 1261 reads and executes these microprograms. A PHY 1263 is a circuit block including the PCIe transmission/reception circuit including a serial-parallel conversion circuit between serial data transferred as data packets by the PCIe protocol and parallel data processed inside the PCIe switch 126.

As shown in FIG. 4B, a routing processing unit 1264 is installed as software for implementing the functions of the same in the PCIe switch 126. The routing processing unit 1264 has a function of routing control for, in the data transfer control executed by the PCIe switch 126, determining the transfer path of each data packet of the PCIe protocol, and the functions are implemented by the CPU 1261 reading the corresponding program from the memory 1262 and executing the same.

The routing table 1216 is also stored in the memory 1262, and is a data table to which the routing processing unit 1264 refers when executing the routing control of the present embodiment. As described above, the routing table 1216 is initially generated by the MP 121, transferred from the MCH 122 and the MPA 124 via the sideband communication paths 125 to the respective PCIe switches 126A, 126B, and stored in the memory 1262. Specific configuration examples of the routing table 1216 are described later.

Data Packet Configuration

Figure 5:
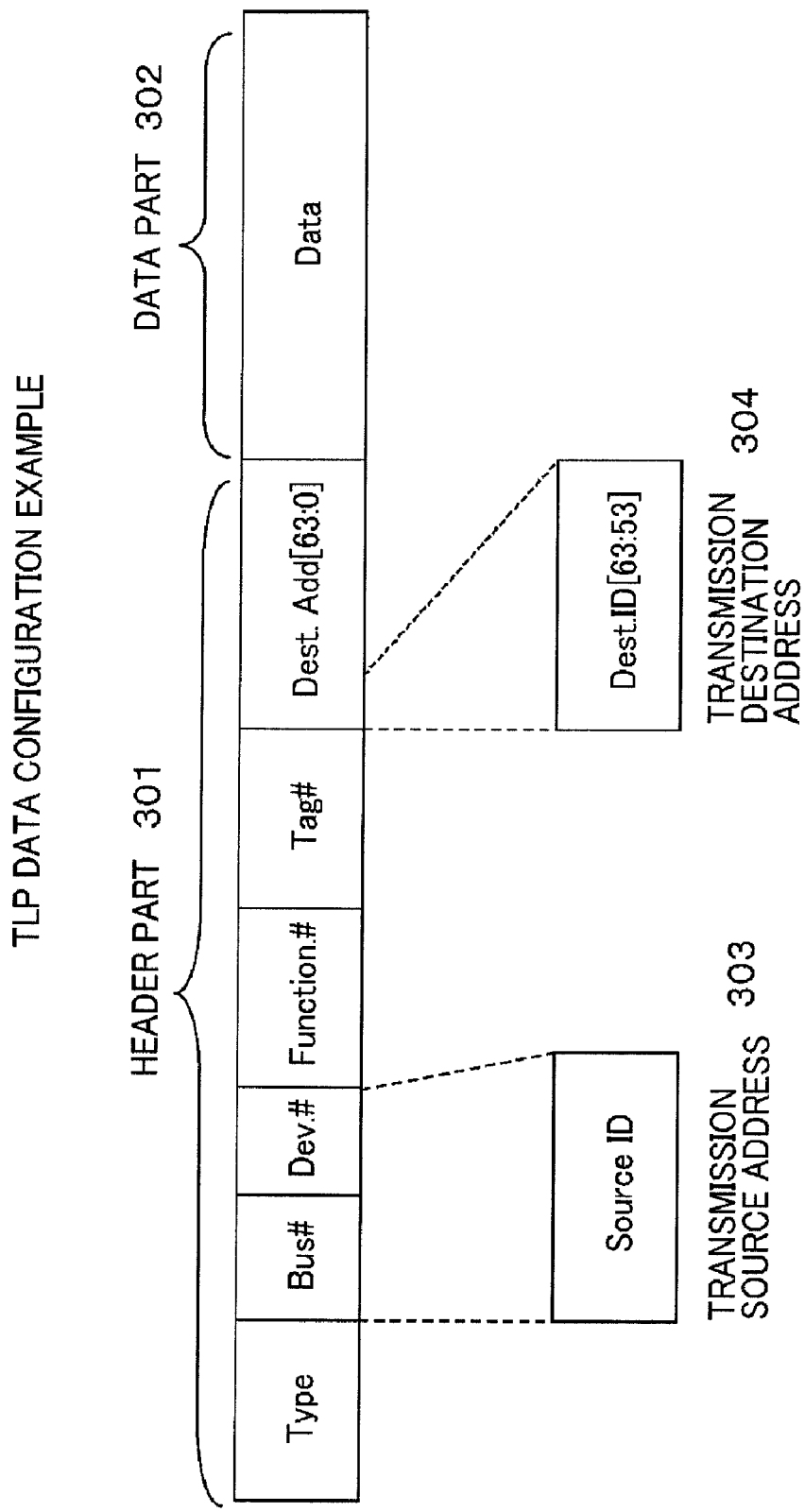
FIG. 5 is an example of the data structure of a transaction layer packet transferred by PCIe.

FIG. 5 shows an example of the data structure of a transaction layer packet (Transaction Layer Packet, hereinafter referred to as a "TLP") which is a data packet used by the PCIe protocol. As shown in FIG. 5, the TLP has a header part 301 and a data part 302. The header part 301 includes, for example, each data of a transaction type, a bus number, a device number, a function number, a tag number, and a transmission destination address, and the data part 302 includes the actual data as the payload transferred by the TLP.

In the present embodiment, in the header part 301 of TLP, the transmission source address 303 is recorded in the blocks of the bus number and the device number and the transmission destination address 304 is recorded in a part of the original transmission destination address. This TLP is generated in the PHY 1263 of each PCIe switch 126, and the above-mentioned transmission source address 303 and transmission destination address 304 are recorded. Furthermore, in the data part 302, message data described later which is particular to the present embodiment may be recorded.

Routing Control by PCIe Switch 126

Figure 6:
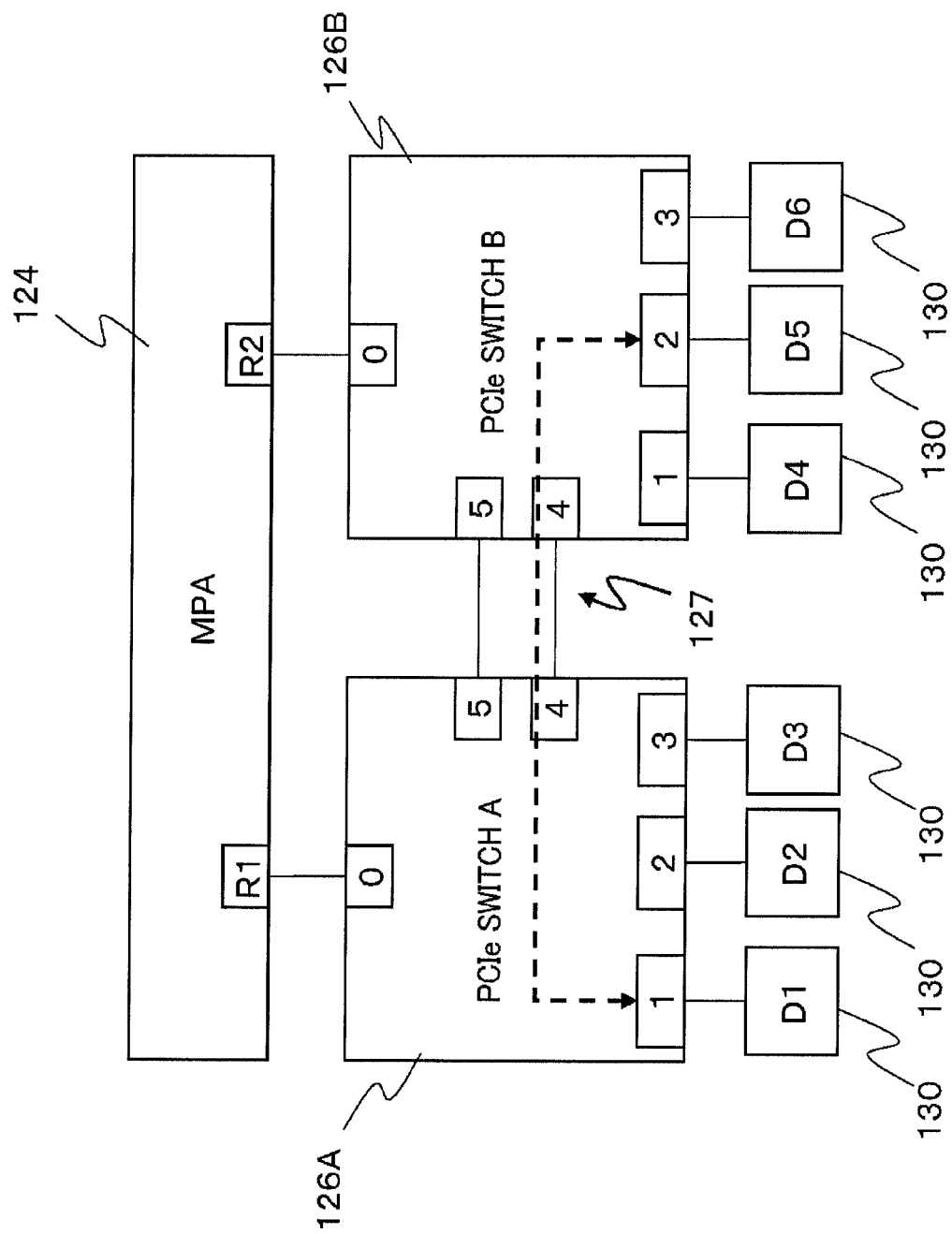
FIG. 6 is a schematic diagram showing the flow of packets through a path coupling PCIe switches.

Next, the routing control related to the inter-switch paths 127 between the PCIe switches 126A, 126B in the present embodiment will be explained. FIG. 6 is a schematic diagram showing the flow of the TLP transfer between the PCIe switches 126A, 126B via the inter-switch paths 127. Note that, hereinafter, a PCIe switch without being distinguished between 126A and 126B is simply referred to as a PCIe switch 126. The routing tables 1216A and 1216B described later are treated similarly.

In the example of FIG. 6, the respective PCIe switches 126A, 126B have communication ports 0 to 5. The numbers attached to the communication ports as the identification IDs may be other identification signs. In the PCIe switch 126A, the communication ports 0 to 5 are respectively connected to the communication port R1 of the MPA 124, the devices from D1 to D3, and the two inter-switch paths 127. Meanwhile, in the PCIe switch 126B, the communication ports 0 to 5 are respectively connected to the communication port R2 of the MPA 124, the devices from D4 to D6, and the two inter-switch paths 127.

In FIG. 6, the dashed line with arrows at both ends indicates the transfer path of the TLP via the PCIe switches 126A, 126B. The example of FIG. 6 shows that the TLP received from the device D1 (130) at the communication port 1 of the PCIe switch 126A, is transmitted from the communication port 4 via the inter-switch path 127 and received at the communication port 4 of the PCIe switch 126B, and is transmitted from the communication port 2 to the device D5. As the PCIe standard assumes the tree-structure topology as described above, a completion notification for the TLP transmitted from the device D1 to the device D5 via the communication port 4 of the PCIe switch 126A also needs to be returned to the device D1 via the communication port 4 of the PCIe switch 126B. That is, a TLP transmitted from a certain device to another device via the PCIe switches 126A, 126B and a completion notification for that needs to be transferred via the same inter-switch path 127 in both directions. Note that the completion notification is described with reference to FIG. 20A later.

Configuration of Routing Table 1216

Figure 7A:
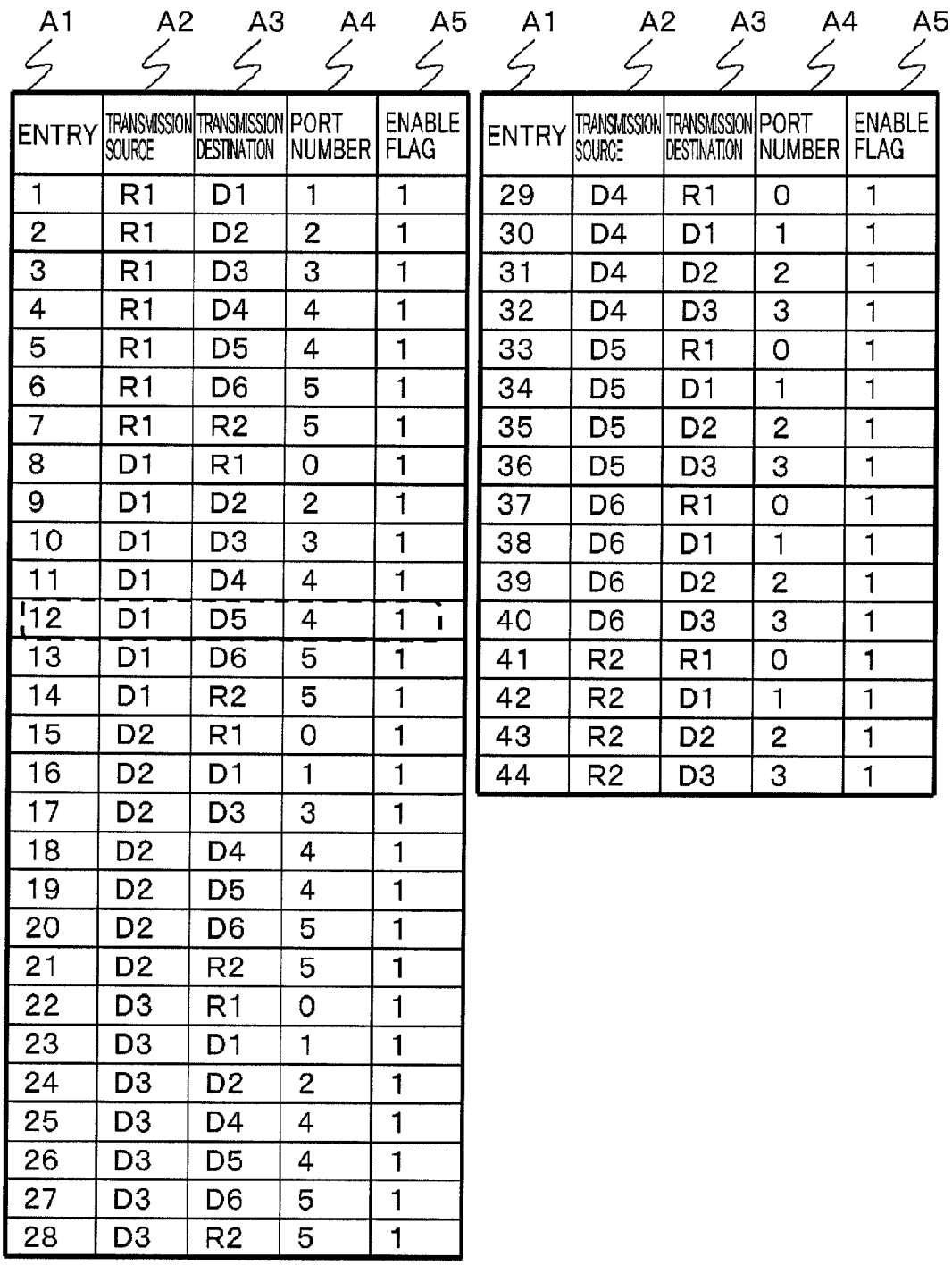
FIG. 7A is an example of a routing table 1216A stored in a PCIe switch A.
Figure 7B:
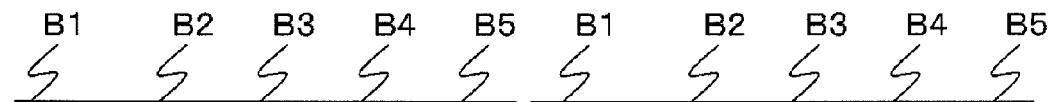
FIG. 7B is an example of a routing table 1216B stored in a PCIe switch B.

Next, explanation will be given on the configuration of the routing table 1216 which is set for realizing the packet transfer control whose example is shown in FIG. 6. FIG. 7A and FIG. 7B show the setting examples of the routing tables 1216A and 1216B stored in the PCIe switch 126A and the PCIe switch 126B respectively. As described above, the routing tables 1216 are generated by the MPs 121, transferred to the respective PCIe switches 126A, 126B, and stored in the memory 1262.

In the routing tables 1216, the respective items of entries, B1, transmission source IDs A2, B2, transmission destination IDs A3, B3, port numbers A4, B4, and enable flags A5, B5 are recorded. The entries A1, B1 are the IDs for mutually distinguishing the data entries recorded in the respective routing tables 1216. The transmission source IDs A2, B2 are the IDs (D1 in the example of FIG. 6) for mutually distinguishing the devices that are the transmission sources of the TLP. The transmission destination IDs A3, B3 are the IDs (D5 in the example of FIG. 6) for mutually distinguishing the devices that are the transmission destinations of the TLP. The port number A4, B4 (internode data transfer path use information) is the ID (4 in the example of FIG. 6) for mutually distinguishing the communication port in each PCIe switch 126 from which the TLP is transmitted. The enable flag A5, B5 is the flag indicating whether the transfer path of the TLP specified for the respective entries A1, B1 is available or not. If the transfer path of the TLP in the corresponding entries A1, B1 is available, 1 is recorded and, if not available, 0 is recorded to the enable flag A5.

At this point, with reference to FIG. 7A, as for the PCIe switch 126A, in "12" of the entry A1, whose transmission source ID A2 is "D1" and whose transmission destination ID A3 is "D5," the port number A4 is 4 and the enable flag A5 is 1. This indicates that, for transferring the TLP from device D1 to device D5, the inter-switch path 127 to which 4 is assigned as the port number A4, is set to be used, and that the path is available.

Similarly, with reference to FIG. 7B, as for the PCIe switch 126B, in "25" of the entry B1, whose transmission source ID B2 is "D5" and whose transmission destination ID B3 is "D1," the port number B4 is 4 and the enable flag B5 is 1. This indicates that, for transferring the TLP from the device D5 to the device D1, the inter-switch path 127 to which 4 is assigned as the port number A4 is set to be used, and that the path is available.

The routing processing units 1264 of the PCIe switches 126A, 126B, with reference to these routing tables 1216 stored in the memory 1262, can respectively transfer the TLP from device D1 to device D5 and return a completion notification in accordance with that the transfer.

Initial Setting Processing of Routing Table 1216

Figure 8:
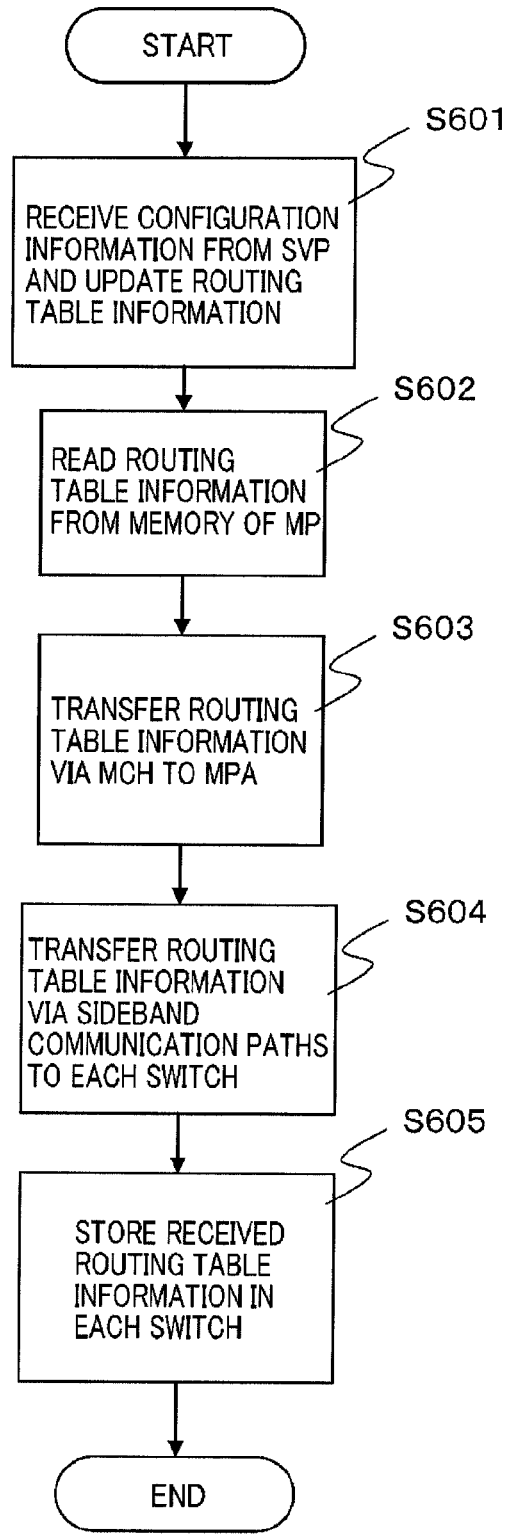
FIG. 8 is an example of an initial setting processing flow of the routing tables 1216.

Next, explanation will be given on the initial setting processing of the routing tables 1216 in FIG. 7A and FIG. 7B described above. FIG. 8 shows an example of the flow of the initial setting processing of the routing table 1216. This initial setting processing is, triggered when the storage apparatus 10 is powered on and the power is supplied to the DKC 12, performed by the routing information management unit 1215 of the MP 121. Hereinafter, the description with the MP 121 as the subject of operation indicates that the MP 121 executes the program corresponding to the function of the routing information management unit 1215. Furthermore, in FIG. 8 and the other figures that follow, the "S" attached to the reference sign showing each processing steps indicates step.

Firstly, after the DKC 12 is powered on, the MP 121 acquires the configuration information from the SVP 15 which the SVP 15 has collected relating to the storage apparatus 10, and updates the information stored in the routing table 1216 maintained in its own local memory as needed (S601). The configuration information related to the storage apparatus 10 may also be manually input to the SVP 15 by the administrator or the like from the management device 40.

For example, when the MP 121 detects, from the configuration information of the storage apparatus 10 newly acquired from the SVP 15, that the device D6 in FIG. 6 has been removed, the MP 121, in the routing table 1216 maintained in its own local memory, changes the enable flags A5, B5 made to correspond to the device D6 from 1 to 0. In the routing table 1216, the transfer path including the device D6 is set to be unavailable in this way.

Next, the MP 121 reads the updated information of the routing table 1216 from the local memory 1213 (S602) and transfers the information to the MPA 124 via the MCH 122 (S603). The MPA 124 transmits the received information of the routing table 1216 to the PCIe switches 126A, 126B via the sideband communication paths 125 (S604). The PCIe switches 126A, 126B store the received information of the routing table 1216 in the respective memories 1263 (S605).

According to the processing above, the information of the routing table 1216 stored in each PCIe switch 126 can be updated to the latest status every time the storage apparatus 10 is powered on, and each PCIe switch 126 can always use a path that is available and ensure the transfer of the TLP.

Routing Control in Case Some Devices are not Installed

Figure 9:
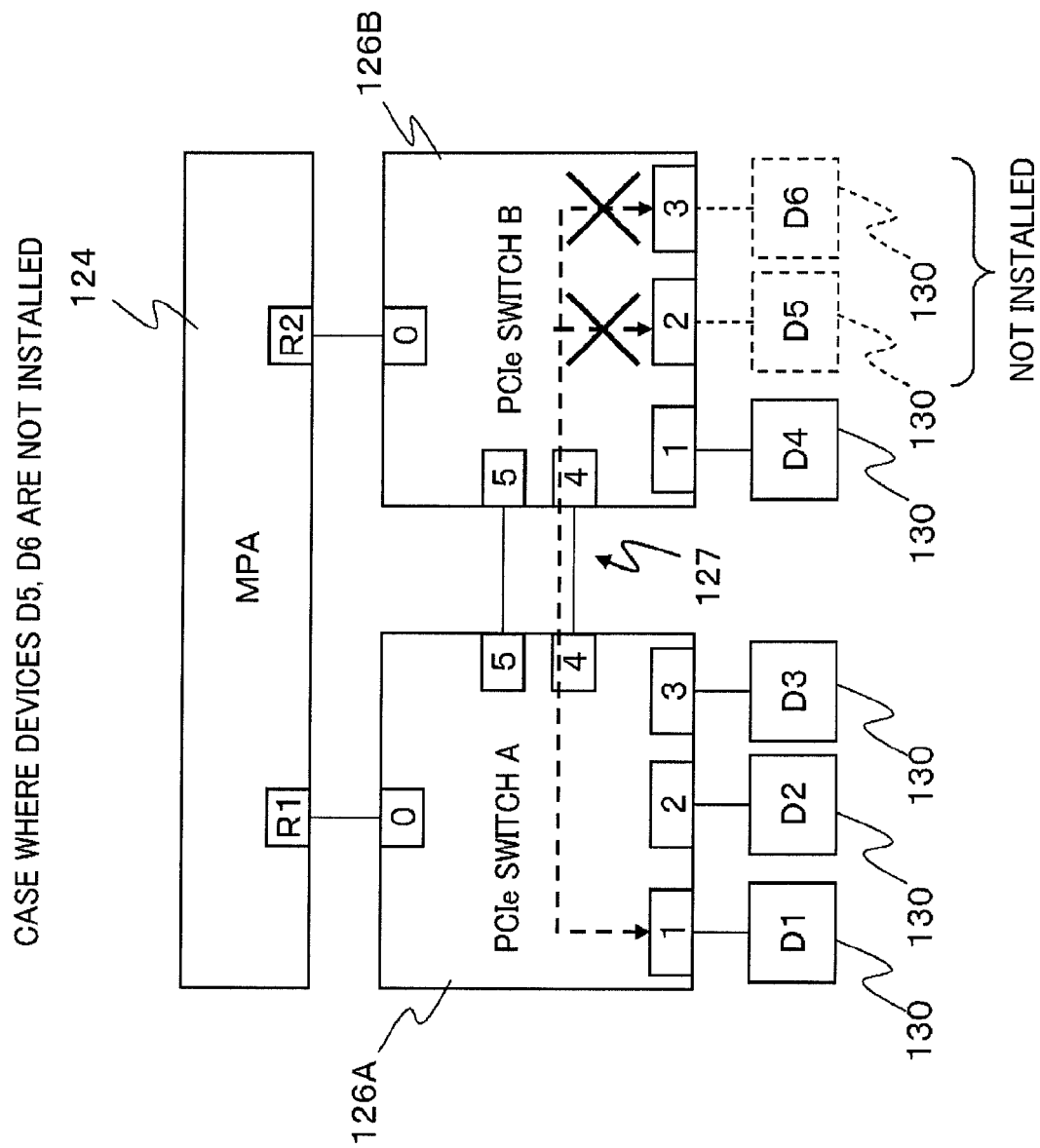
FIG. 9 is a schematic diagram showing the flow of packets in case where the devices D5 and D6 are not installed in FIG. 6.

Next, explanation will be given on a case where the devices D5, D6 are not installed in the storage apparatus 10 in the configuration of the example shown in FIG. 6. FIG. 9 shows a schematic diagram showing the flow of packets in a case where the devices D5 and D6 are not installed in FIG. 6. Meanwhile, FIG. 10A, FIG. 10B show the routing tables 1216A, 1216B which the PCIe switches 126A, 126B respectively use, corresponding to FIG. 9.

In this case, since it is obvious that neither of the PCIe switches 126A, 126B can use the path including the devices D5, D6 as the transmission source or the transmission destination, as indicated by the encircling dashed line in FIG. 10A, FIG. 10B, 0 is set to the enable flags A5, B5 made to correspond to the entries A1, B1 including "D5," "D6" in the transmission source IDs A2, B2 and the transmission destination IDs A3, B3. This situation occurs, for example, if the storage apparatus 10 is powered on while the storage devices corresponding to the devices D5, D6 are not coupled.

Processing in Case Failure Occurs in Some Devices

Figure 11:
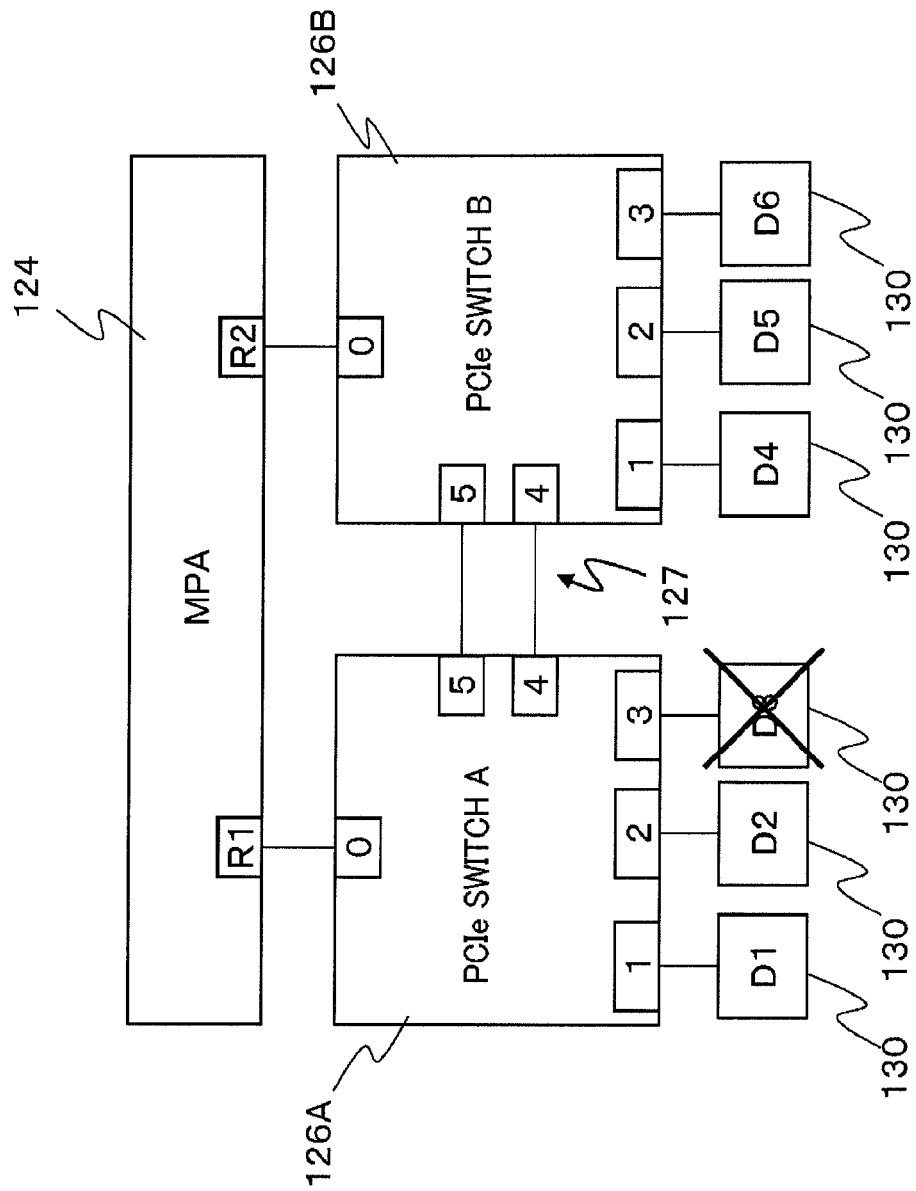
FIG. 11 is a schematic diagram showing the flow of packets in a case where a failure occurs to the device D3 in FIG. 6.

Next, explanation will be given on the case where a failure occurs in the device D3 in the configuration exemplified in FIG. 6. FIG. 11 shows a schematic diagram showing a flow of packets in case where a failure occurs in the device D3 in FIG. 6. As a general function, each of the PCIe switches 126A, 126B has a function of constantly monitoring the status of each communication port 126-n by the CPU 1261 which the switch itself has, and can detect the occurrence of a failure in each device and autonomously deal with the same. FIG. 12A and FIG. 12B show the routing tables 1216A, 1216B which the PCIe switches 126A, 126B respectively use, corresponding to FIG. 11.

In this case, since it is obvious that neither of the PCIe switches 126A, 126B can use the path including the device D3 as the transmission source or the transmission destination device, as indicated by the encircling dashed line in FIG. 12A, FIG. 12B, 0 is set to the enable flags A5, B5 made to correspond to the entries A1, B1 including "D3" in the transmission source IDs A2, B2 and the transmission destination IDs A3, B3.

Communication Port Block Processing for Dealing with Device Failure

Figure 13:
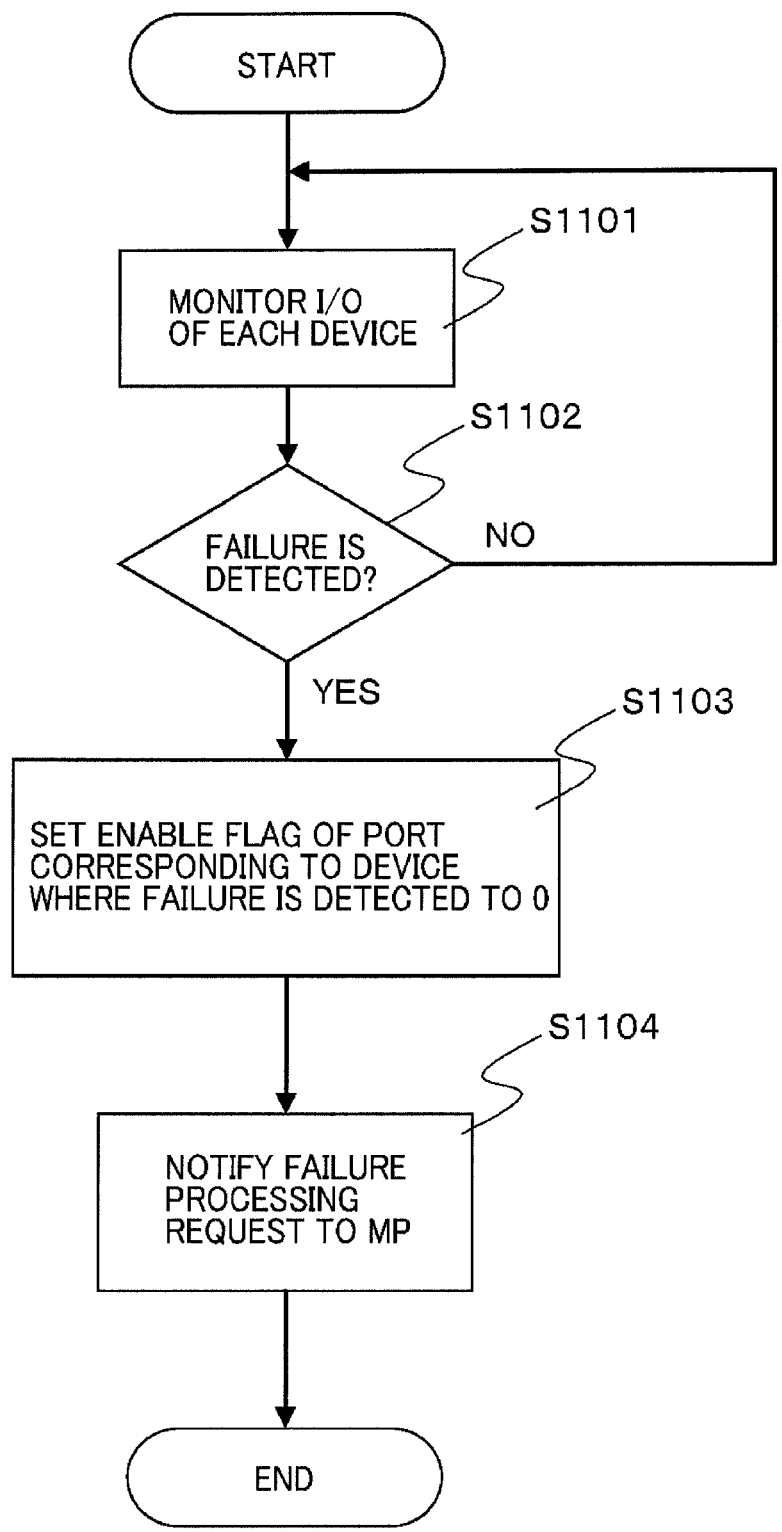
FIG. 13 is an example of a flow of a port block processing in a case of a device failure.

Explanation will be given on the communication port block processing performed by the PCIe switch 126 in a case the occurrence of a device failure described above. FIG. 13 shows an example of a flow of the communication port block processing. The communication port block processing is executed by the routing processing unit 1264 of the PCIe switch 126. Note that, though the example of FIG. 13 assumes that the routing processing unit 1264 monitors the status of each device coupled via each communication port, a configuration in which a monitoring unit is installed separately may also be adopted.

Firstly, the routing processing unit 1264 constantly checks whether the status of the device D coupled to the PCIe switch 126 to which the routing processing unit 1264 belongs is abnormal or not by, for example, monitoring the data I/O between the relevant device D (S1101, S1102) and, when detecting a failure in a certain device (S1102, Yes), for blocking the communication port 126-n to which the device D where the occurrence of the failure is detected is connected (the communication port 3 in the device D in FIG. 11), the routing processing unit 1264 sets the enable flags A5, B5 made to correspond to the port numbers A4, B4 of the communication port 126-n which is intended to be blocked in the routing table 1216 to 0. Then, the routing processing unit 1264 notifies to the MP 121 via the sideband communication path 125, the MPA 124, and the MCH 122 that a failure has occurred in the device D and that the corresponding communication port 126-n is blocked (S1104). The MP 121 that has received the notification can transmit the information and the like requiring the management device 40 to deal with the failure via the SVP 15.

According to the processing described above, the PCIe switches 126, by detecting a device failure and blocking the corresponding communication port 126-n, can surely make unavailable the data transfer path including the failed device and also provide the information which promotes the administrator or the like to deal with the device failure.

Processing for Installing an Additional Device

Figure 14:
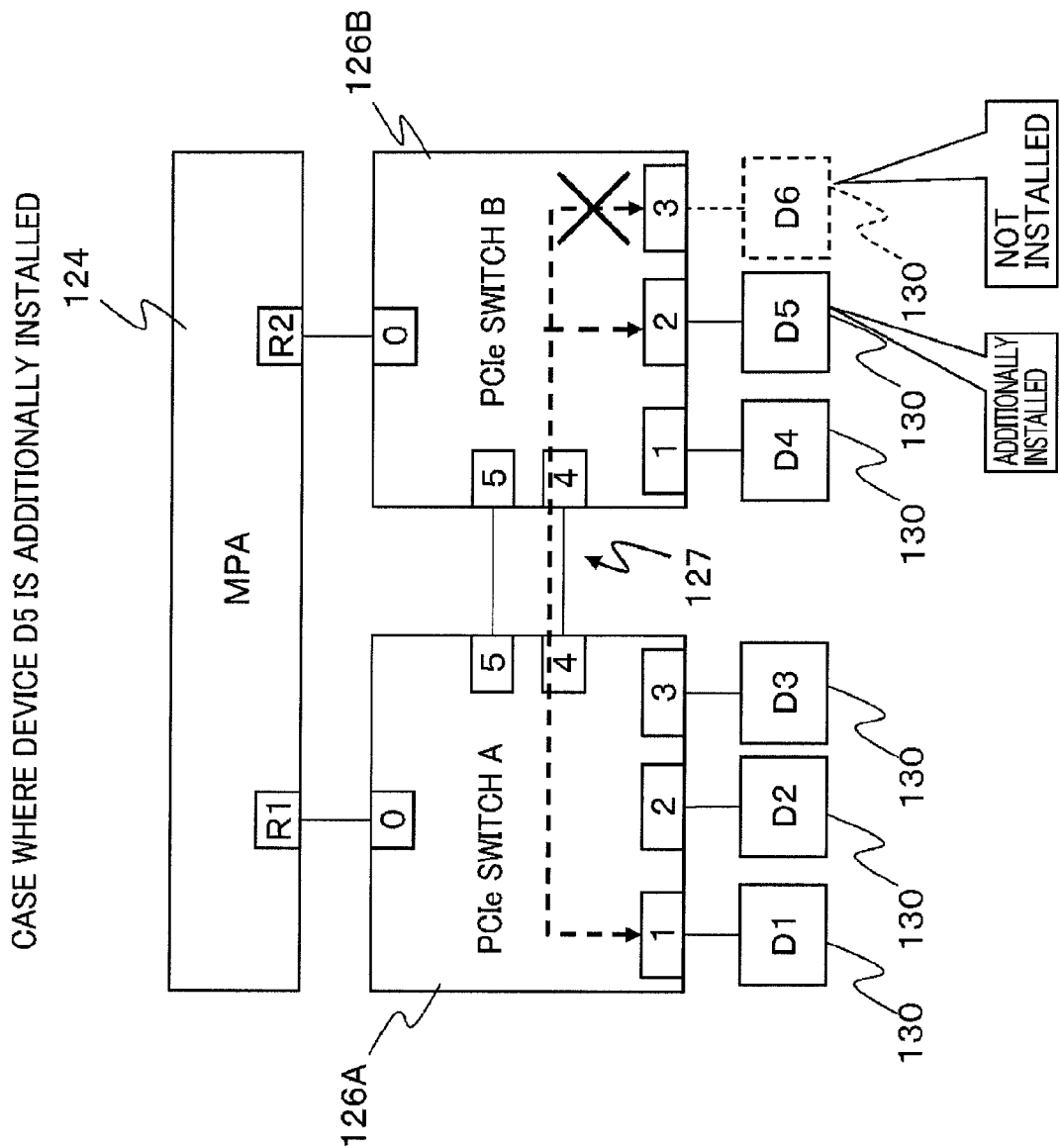
FIG. 14 is a pattern diagram showing a flow of packets in a case where the device D5 is additionally installed in FIG. 9.

Next, explanation will be given on a case where the device D5 is additionally installed in a configuration where the devices D5 and D6 are not installed in the example shown in FIG. 9. FIG. 14 shows a schematic diagram showing a flow of packets in a case where the device D5 is additionally installed in FIG. 9. FIG. 15A and FIG. 15B show the routing tables 1216A, 1216B which the PCIe switches 126A, 126B respectively use, corresponding to FIG. 14.

In this case, while the path including the device D5 becomes available to the PCIe switches 126A, 126B as the transmission source or the transmission destination, the path including the device D6 is still unavailable. In FIG. 15A, FIG. 15B, as for the entries A1, B1 including the device D5 as the transmission source or the transmission destination device, the corresponding enable flags A5, B5 are changed from 0 to 1. Furthermore, as indicated by the encircling dashed line, 0 is still set to the enable flags A5, B5 made to correspond to the entries A1, B1 including "D6" as the transmission source IDs A2, B2 and the transmission destination IDs A3, B3.

Additional Device Installation Handling Processing

Figure 16:
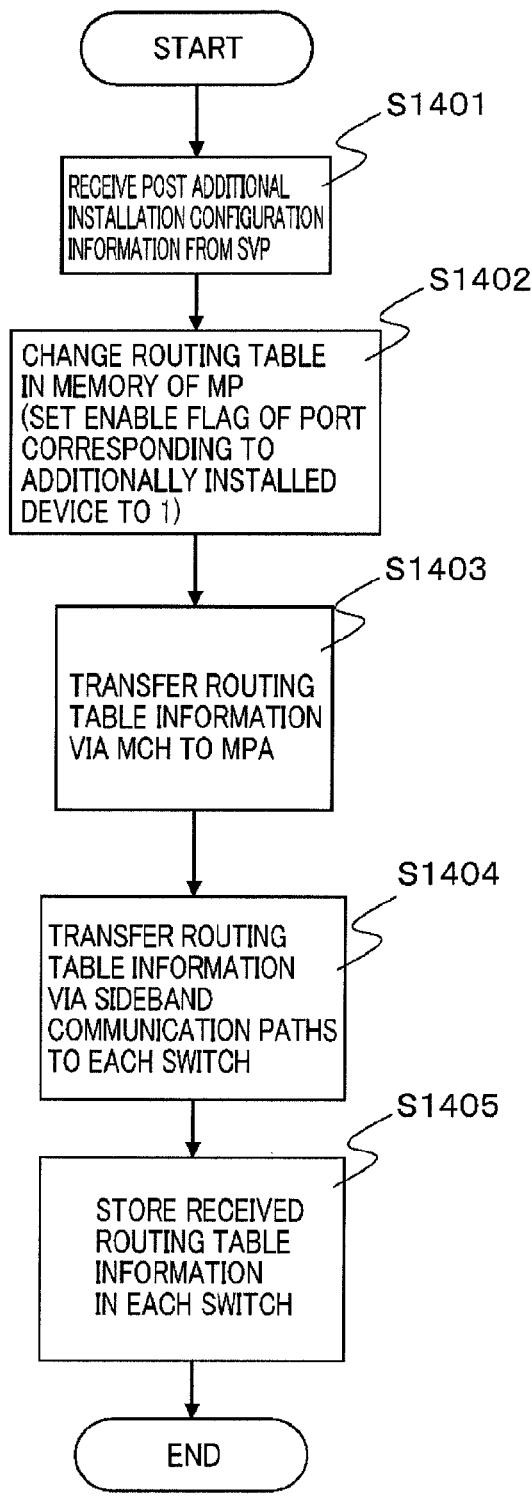
FIG. 16 is an example of a flow of an additional device installation handling processing.

Explanation will be given on the additional device installation handling processing in the above described additional device installation which is executed in the PCIe switch 126. FIG. 16 shows an example of the flow of the additional device installation handling processing. The additional device installation handling processing is performed by the MP 121 executing the corresponding microprogram stored in the local memory.

Firstly, after the additional device installation, the MP 121 is triggered when the storage apparatus 10 is powered on for the first time, or when receiving an instruction to execute the additional device installation handling processing from the management device 40 via the SVP 15, acquires the configuration information from the SVP 15 which the SVP 15 collected relating to the storage apparatus 10 (S1401).

Next, the MP 121, for the information stored in the routing table 1216 maintained in its own local memory, changes from 0 to 1 the enable flags A5, B5 corresponding to the entries A1, B1 including the device additionally installed as the transmission source or as the transmission destination (device D5 in the example of FIG. 14) (S1402). The configuration information related to the storage apparatus 10 may also be manually input to the SVP 15 by the administrator or others from the management device 40.

Next, the MP 121 reads the updated information of the routing table 1216 from the local memory, and transfers the same via the MCH 122 to the MPA 124 (S1403). The MPA 124 transmits the received information of the routing table 1216 to the PCIe switches 126A, 126B via the sideband communication paths 125 (S1404). The PCIe switches 126A, 126B store the received information of the routing table 1216 in the respective memories 1262 (S1405).

According to the processing described above, even when a device to be the transmission source or the transmission destination of data packets is additionally installed, the PCIe switch 126 can thereafter automatically use the data transfer path including the relevant additionally installed device.

Processing in Case Failure Occurs in Inter-Switch Path 127

Figure 17:
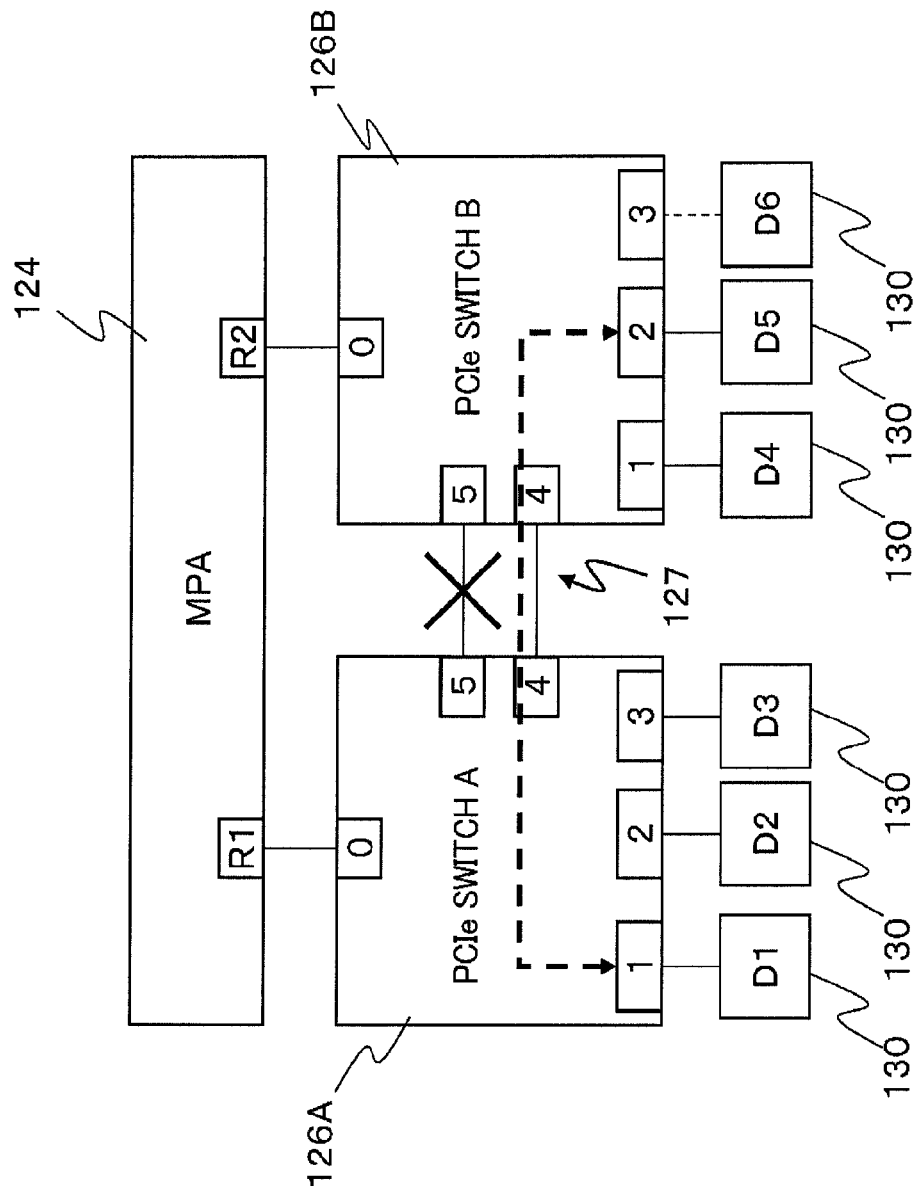
FIG. 17 is a schematic diagram showing the flow of packets in a case where a failure occurs to the path coupling the ports No. 5 of the PCIe switch in FIG. 6.
Figure 18B:
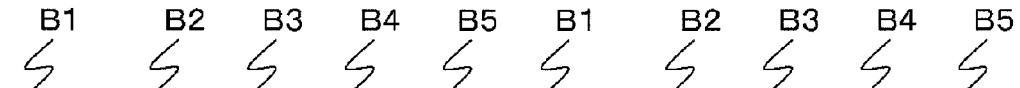
FIG. 18B is an example of a routing table 1216B stored in the PCIe switch B in a case where a failure occurs to the path coupling the ports No. 5 of the PCIe switch.

Next, explanation will be given on a case where, among the two inter-switch paths 127 coupling the PCIe switches 126A, 126B, a failure occurs in the path 127 coupling the respective communication ports 5 of the PCIe switches 126A, 126B in the configuration exemplified in FIG. 6. FIG. 17 shows a schematic diagram showing a flow of packets in a case where a failure occurs in the inter-switch path 127 using the communication ports 5 of the PCIe switches 126 in FIG. 6. FIG. 18A and FIG. 18B show the routing tables 1216A, 1216B which the PCIe switches 126A, 126B respectively use, corresponding to FIG. 17.

In this case, neither of the PCIe switches 126A, 126B, can use the path including the communication ports 5 when transferring data packets to the other of the PCIe switches 126A, 126B. Therefore, in FIG. 18A and FIG. 18B, for the entries A1, B1 including "5" as the port numbers A4, B4 for the transmission source devices A2, B2 or for the transmission destination devices A3, B3, as indicated by the encircled dashed line, the numbers are changed to "4." Note that, though those relevant parts in FIG. 18A, FIG. 18B are described as "5->4" for easier understanding, the actual description may be sufficient by recording "4" indicating the communication ports which are used after the change.

Failed Path Alternate Processing using MP 121

Figure 19:
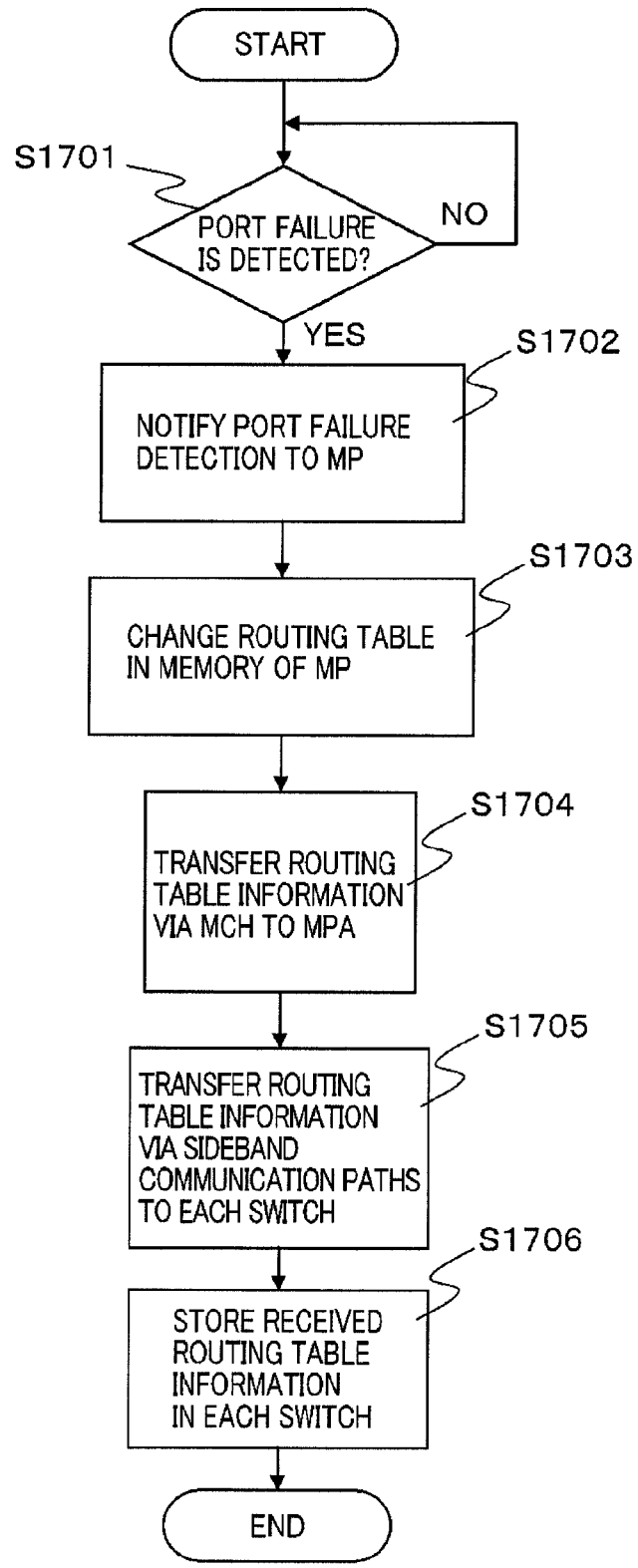
FIG. 19 is an example of the flow of an alternate processing for a failed path between the PCIe switches.

The failed path alternate processing executed by the MP 121 in the above described case where a failure occurs in the inter-switch path 127 is described below. FIG. 19 shows an example of the flow of the failed path alternate processing. The failed path alternate processing is performed by the processing of the MP 121 executing the corresponding microprogram stored in the local memory in cooperation with the processing by the routing processing unit 1264 in the PCIe switch 126.

Firstly, while the storage apparatus 10 is operating, the routing processing unit 1264 in the PCIe switch 126 continues to monitor whether or not a failure has occurred in the communication ports (communication ports 4, 5 in the example of FIG. 6) included in the inter-switch path 127 (S1701, No) and, when detecting the occurrence of a failure in any one of the communication ports (S1701, Yes), notifies to the MP 121 that the failure has occurred in the communication port included in the inter-switch path 127 (S1702).

The MP 121 which has received the above-mentioned notification, for the information stored in the routing table 1216 maintained in its own local memory, as for the entries A1, B1 including the communication port of which the occurrence of the failure was notified (communication port "5" in the example of FIG. 17) as the port numbers A4, B4 for the transmission source devices A2, B2 or for the transmission destination devices A3, B3, changes the same to another normal communication port number (communication port "4" in the example of FIG. 17) (S1703).

Next, the MP 121 reads the updated information of the routing table 1216 from the local memory and, via the MCH 122, transfers the information to the MPA 124 (S1704). The MPA 124 transmits the received information of the routing table 1216 to the PCIe switches 126A, 126B via the sideband communication paths 125 (S1705). The PCIe switches 126A, 126B store the received information of the routing table 1216 in the respective memories 1262 (S1706).

According to the processing described above, even when a failure occurs in any of the inter-switch paths 127, data packet transfer between the PCIe switches 126 can be continued, which can improve the reliability and the availability as the storage apparatus 10.

Response Processing when Failure Occurs

Figure 20A:
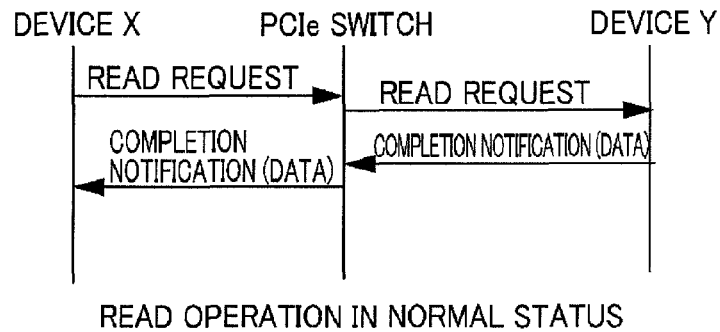
FIG. 20A is an explanatory diagram related to a response processing in a case a path failure occurs between the PCIe switches, and shows a read operation in a normal status.
Figure 20B:
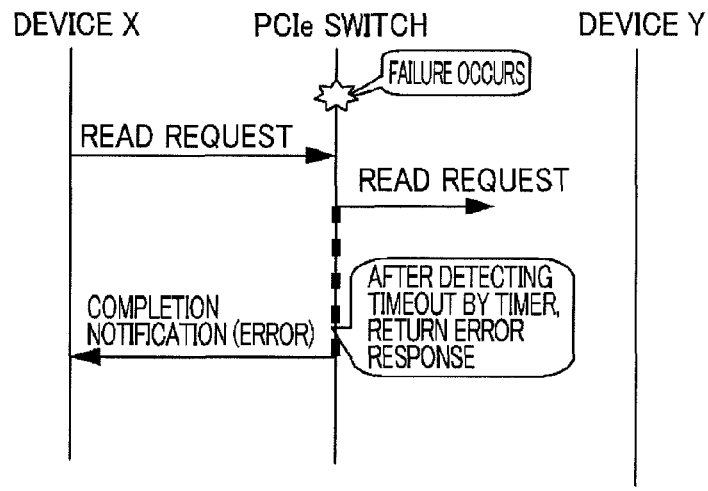
FIG. 20B is an explanatory diagram related to a response processing in a case a failure occurs between the PCIe switches, and shows a read operation in a conventional case where a failure occurs.
Figure 20C:
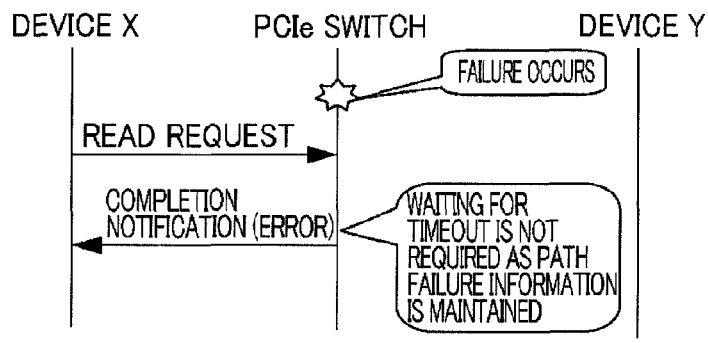
FIG. 20C is an explanatory diagram related to a response processing in case a failure occurs between the PCIe switches, and shows a read operation of the present embodiment when a failure occurs.

Next, the response processing performed in the PCIe switch 126 in the above described case where a failure occurs in the inter-switch path 127 is described below. FIGS. 20A to 20C are schematic diagrams which describe the response processing in the PCIe switch 126 in the present embodiment, with a case where a read request is transmitted from a certain device X to another device Y via the PCIe switch as an example.

If the data transfer path from the device X to the device Y via the PCIe switch 126 is normal, as shown in FIG. 20A, the read request transmitted from the device X is transferred by the PCIe switch and is received at the device Y. The device Y receiving the read request reads the data related to the request, transmits the same with the completion notification to the PCIe switch, and the data is transferred to the device X by the PCIe switch. Through this series of data transfer processing, the device X can confirm that the read request transmitted by the device X is normally processed.

FIG. 20B shows an example of the response processing which is conventionally performed in the processing of FIG. 20A, in a case where some kind of failure occurs in the PCIe switch and the PCIe switch cannot transfer the read request to the device Y which is the transmission destination of the read request. In this case, the PCIe switch, which, in spite of attempting to transfer the read request to the device Y, cannot receive a completion notification from the device Y, so that after waiting to receive the completion notification for a specific period of time, determines that a timeout error has occurred and transmits the completion notification including the message to that effect to the device X. Therefore, as the device X cannot confirm the result of transmitting the read request until after the timeout error processing at the PCIe switch, there is fear that the data processing efficiency is deteriorated.

FIG. 20C shows an example of the response processing at the PCIe switch in the present embodiment. As described in relation to FIG. 19, as for the present embodiment, the PCIe switch 126, by the own function of the routing processing unit 1264, can detect the occurrence of a failure in the communication port. Therefore, as shown in the schematic diagrams, the PCIe switch, when determining that the read request from the device X is to be transmitted through the failed data transfer path to the device Y as the transmission destination, instead of transmitting the read request from the device X to the device Y, can immediately return the completion notification including the information that a transmission error has occurred to the device X. Therefore, the device X can go on with the processing without waiting for timeout error information from the PCIe switch, which can prevent the deterioration of the data processing efficiency.

Data Configuration Example Used for Response Processing

FIG. 21 shows a configuration example of the completion notification data which, in the response processing performed at the time of the occurrence of a path failure of the example shown in FIG. 20C, the PCIe switch transmits to the device X as the transmission source of the read request. In this completion notification, similar to the normal completion notification, information indicating that this is the completion notification, the transmission source ID and the transmission destination ID are included at the header part. While, in the data part, information indicating that a failure occurred in the data transfer path to the device Y and that the transfer cannot be performed, for example, the error code, the failed communication port ID, the physical layer error counter value described later, and the like can be stored. In this way, the microprogram of the MP 121 or the like is no longer required to perform the processing of acquiring error information separately. Note that the example of the data configuration of a read request shown in FIG. 21 is the same as a conventional type, and the transaction type may also be other than the read request, such as the write request.

Communication Port Failure Detection Processing

Figure 22:
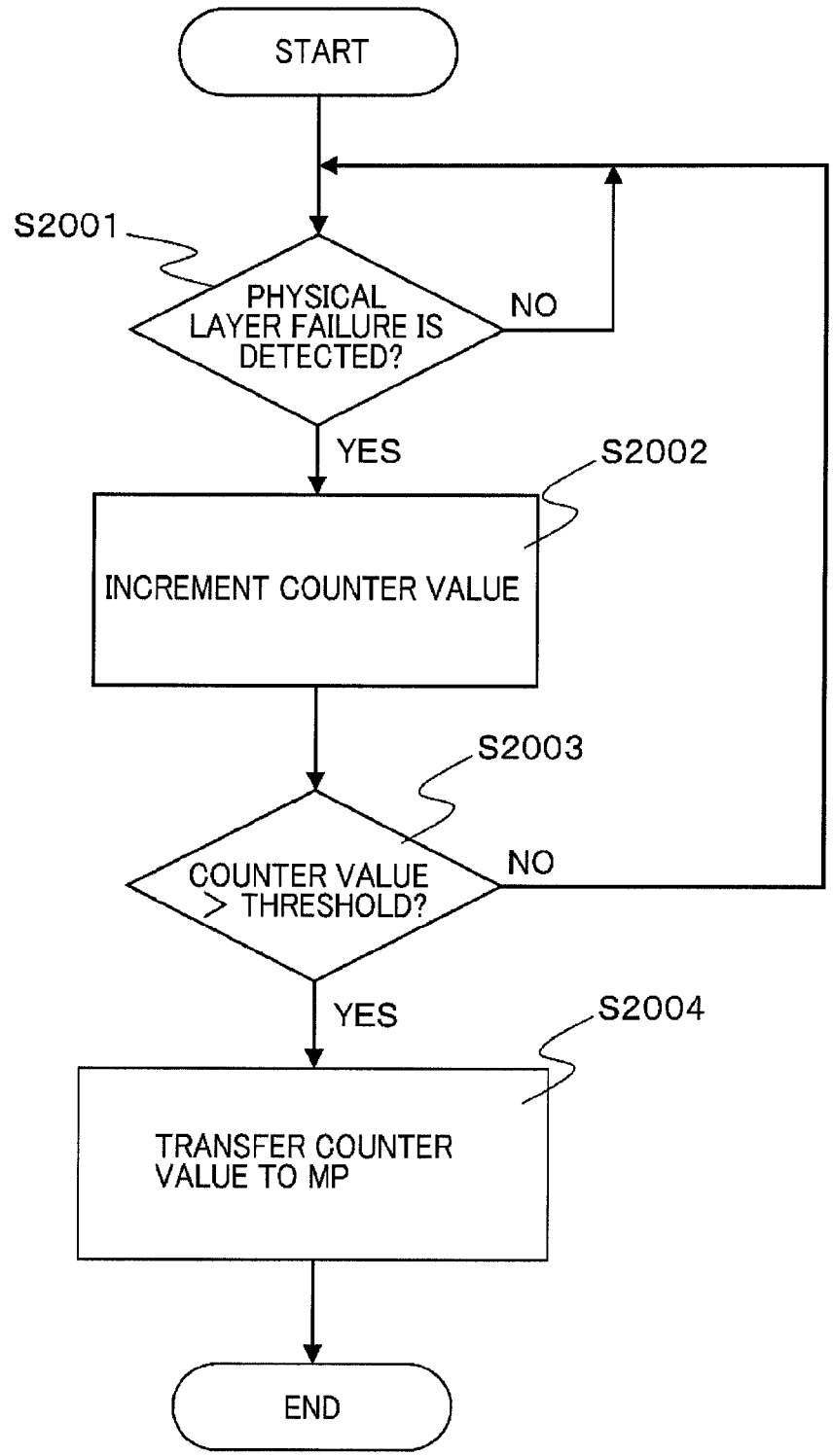
FIG. 22 is an example of the flow of a port failure detection processing of the PCIe switches.

Next, the step of the communication port failure detection (S1701) which is executed in the failed path alternate processing in FIG. 19 is described in more details in line with the present embodiment. FIG. 22 shows an example of the flow of the port failure detection processing executed by the routing processing unit 1264 in the PCIe switch 126 in the present embodiment.

While the storage apparatus 10 is operating, the routing processing unit 1264 continues to monitor whether the PHYs 1263 configuring each communication port 126-n are normally operating (S2001, No) and, if determining that, due to the occurrence of a failure in any of the PHYs 1263, that a failure has occurred in the physical layer in the data transfer path including the communication port 126-n which the relevant PHY 1263 configures (S2001, Yes), increments the physical layer failure detection counter maintained in the routing processing unit 1264 (S2002).

Next, the routing processing unit 1264 determines whether or not the counter value of the physical layer failure determination count r has exceeded the threshold set in the routing processing unit 1264 in advance for failure determination (S2003) and, if determining that the threshold has not exceeded (S2003, No), returns the processing to S2001, and continues to monitor the physical layer of each communication port 126-n.

The routing processing unit 1264, when determining that the counter value has exceeded the threshold (S2003, Yes), transfers the physical layer failure information of the communication port 126-n including the detected counter value and the ID of the failed communication port 126-n (e.g. the port numbers "4" and "5" of FIG. 6) (S2004). The MP 121, with reference to the received physical layer failure information, can update the routing table 1216 which the same maintains.

Failed Path Alternate Processing in PCIe Switches

Next, explanation will be given on the configuration for executing the failed path alternate processing in the PCIe switch 126 autonomously, without involving the processing by the MP 121. FIG. 23A and FIG. 23B show the setting examples of the routing tables 1216 used when performing the failed path alternate processing in the PCIe switch 126. These routing tables 1216A, 1216B are different from the routing tables 1216 of the present embodiment shown in FIG. 7A, FIG. 7B and the like in that the items of the alternate port numbers A41, B41 are added.

The PCIe switch 126 under normal operating condition executes the data transfer processing among devices by using the communication ports 126-n recorded in the items of the port numbers A4, B4. Then, when the routing processing unit 1264 detects that a failure has occurred in those communication ports 126-n which are used under normal operating conditions, performs the data transfer processing by using the other communication ports 126-n specified by the alternate port numbers A41, B41 which are recorded corresponding to the failed communication ports 126-n. In the examples of FIG. 23A, FIG. 23B, in line with the configuration of the example shown in FIG. 6, for the communication ports 126-n whose port numbers A4 and B4 are "4" and "5," the alternate port numbers "5" and "4" are set respectively as the alternate port numbers A41, B41.

Figure 24:
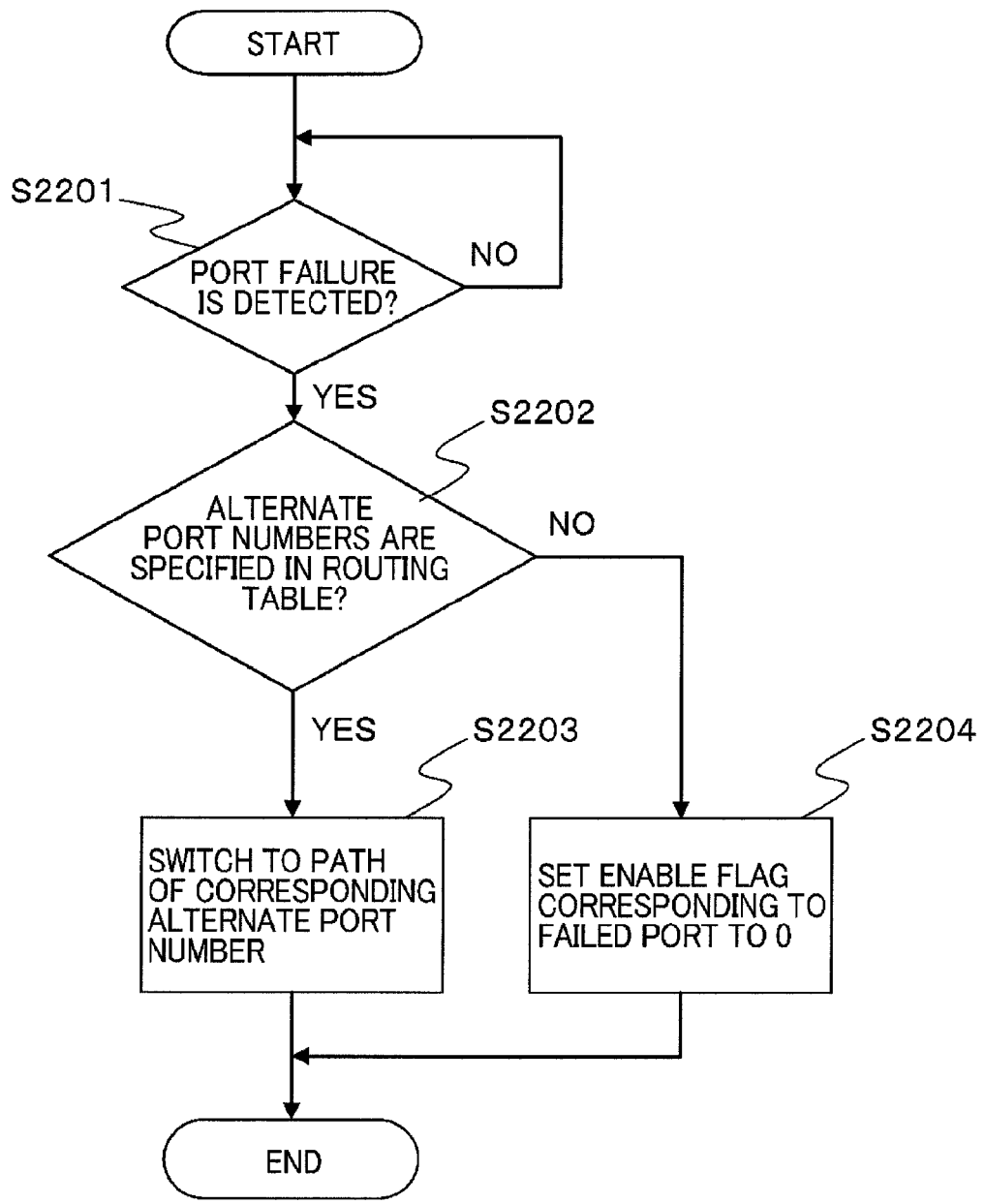
FIG. 24 is an example of the flow of a failed path alternate processing between the PCIe switches utilizing the alternate port numbers.

Next, explanation will be given on the flow of the failed path alternate processing in the PCIe switch 126 by using the routing tables 1216A, 1216B of FIG. 23A, FIG. 23B where the alternate port numbers A41, B41 are set. FIG. 24 shows an example of the flow of the failed path alternate processing in the PCIe switch 126.

Firstly, while the storage apparatus 10 is operating, the routing processing unit 1264 in the PCIe switch 126 continues to monitor whether or not a failure has occurred in the communication ports (communication ports 4, 5 in the example of FIG. 6) included in the inter-switch path 127 (S2201, No) and, when detecting the occurrence of a failure in any of the communication ports (S2201, Yes), refers to the routing table 1216 maintained in the same and determines whether the alternate port numbers A41, B41 are recorded or not (S2202).

When determining that the alternate port numbers A41, B41 are recorded (S2202, Yes), the routing processing unit 1264 thereafter executes the data transfer processing by using the set alternate port numbers A41, B41, for the failed communication port 126-n (S2203). When determining that the alternate port numbers A41, B41 are not recorded (S2202, No), the routing processing unit 1264, for the entry where the port number corresponding to the communication port 126-n from which the occurrence of the failure is detected is recorded in the routing table 1216, changes the enable flag A5, B5 to 0 (S2204), and from this point on, does not perform the data transfer processing using the relevant communication port 126-n.

According to the above-described processing, even if a failure occurs in either of the inter-switch paths 127, the data packet transfer can be continued by switching to the alternate communication port 126-n in the PCIe switch 126, which can improve the reliability and the availability as the storage apparatus 10 without increasing the processing load of the MP 121.

Note that, though the embodiment above describes the processing executed for the inter-switch paths 127 provided in the same DKC 12, the present invention can also be applied to the duplicate system data transfer path provided between the switches installed in two different DKCs 12 or different device chassis.

According to the embodiment of the present invention as described above in details, a storage control device capable of improving the availability as a system while improving the reliability of a data transfer path and a data transfer method can be provided.

Though the present embodiment has been described as above, the above-mentioned embodiment is intended for ease of understanding this invention and by no means limited to any particular constructions herein disclosed. This invention also includes any changes, modifications or equivalents within the spirit and scope hereof.

The invention claimed is:

1. An information processing apparatus comprising:
a plurality of data transfer paths, through which serial data transfer is performed; and
a plurality of nodes including a root node and terminal nodes coupled to a plurality of devices, the root node being coupled to each of the terminal nodes via the data transfer paths branching in a tree structure, and a pair of the terminal nodes coupled to each other via two data transfer paths without the root node,
wherein the terminal nodes are configured to:
store routing information of the data transfer path related to a data transmission source and a data transmission destination which is defined so as to use the same data transfer path as an opposite side data transmission; and
control data transmission using the data transfer path which is defined by the routing information,
wherein a first terminal node of the terminal nodes, which is coupled to a second terminal node of the terminal nodes via a first data transfer path and a second data transfer path, is configured to:
transfer data to a first device coupled to the second terminal node via the first data transfer path according to the routing information; and
transfer data to a second device coupled to the second terminal node via the second data transfer path according to the routing information.

2. The information processing apparatus according to claim 1,
  wherein the information processing apparatus is a storage control device that controls data I/O (input/output) between a recording medium and a computer, serial data transfer between the root node and the plurality of nodes is performed under PCI Express (registered trademark) standard, the terminal nodes being switches used by PCI Express, the plurality of nodes including a disk adapter controlling data I/O with a recording medium, and a channel adapter controlling communication with the computer,
  wherein the terminal nodes each store internode data transfer path use information that is information indicating whether to execute data transfer using any one of the internode data transfer path in a manner corresponding to each combination of the transmission source node and the transfer destination node,
  wherein the routing processing unit acquires the internode data transfer path use information based on the transmission source node and the transmission destination node recorded in data to be transferred,
  wherein the root node collects information indicating a coupling status of each of the nodes via the data transfer path, generates the internode data transfer path use information based on the collected information, and transfers the generated internode data transfer path use information to the terminal nodes,
  wherein a routing processing unit records information that the internode data transfer path is unavailable to the internode data transfer path use information including the transmission source node or the transmission destination node when detecting that communication with any one of the transmission source node or the transmission destination node is impossible,
  wherein the routing processing unit records information that the internode data transfer path is available to the internode data transfer path use information including the transmission source node or the transmission destination node when detecting that communication has become possible on the transmission source node or the transmission destination node with which communication were detected to be impossible,
  wherein the routing processing unit notifies to the root node that any one of the internode data transfer paths has become unavailable when the routing processing unit detects that any one of the internode data transfer paths has become unavailable,
  wherein the root node records the available internode data transfer path in place of the unavailable internode data transfer path, on the internode data transfer path use information generated by the root node, and transfers the internode data transfer path use information to the terminal node, and
  herein the routing processing unit transmits to the transmission source node information that data transfer to the transmission destination node is impossible when receiving data to be transferred to the transmission destination node that uses the internode data transfer path unavailable from the transmission source node.

3. The information processing apparatus according to claim 1,
  wherein the terminal nodes each store internode data transfer path use information that is information indicating whether to execute data transfer using any one of the internode data transfer path in a manner corresponding to each combination of the transmission source node and the transmission destination node, and
  wherein a routing processing unit acquires the internode data transfer path use information based on the transmission source node and the transmission destination node recorded in data to be transferred.

4. The information processing apparatus according to claim 3, wherein the root node collects information indicating a coupling status of each of the nodes via the data transfer path, generates the internode data transfer path use information based on the collected information, and transfers the generated internode data transfer path use information to the terminal nodes.

5. The information processing apparatus according to claim 3, wherein the routing processing unit notifies to the root node that any one of the internode data transfer paths has become unavailable when the routing processing unit detects that any one of the internode data transfer paths has become unavailable, the root node records the available internode data transfer path in place of the unavailable internode data transfer path, on the internode data transfer path use information generated by the root node, and transfers the internode data transfer path use information to the terminal node.

6. The information processing apparatus according to claim 3,
  wherein the routing processing unit stores in the internode data transfer path use information relating to the internode data transfer path that replaces any one of the internode data transfer paths when the any one of the internode data transfer paths becomes unavailable, and
  wherein the routing processing unit refers to the internode data transfer path use information and executes data transfer by using the available internode data transfer path in place of the unavailable internode data transfer path, when detecting that the any one of the internode data transfer paths has become unavailable.

7. The information processing apparatus according to claim 1, wherein a routing processing unit records information that the internode data transfer path is unavailable to the internode data transfer path use information including the transmission source node or the transmission destination node as detected when detecting that communication with any one of the transmission source node or the transmission destination node is impossible.

8. The information processing apparatus according to claim 7, wherein the routing processing unit records information that the internode data transfer path is available to the internode data transfer path use information including the transmission source node or the transmission destination node when detecting that communication has become possible on the transmission source node or the transmission destination node with which communication were detected to be impossible.

9. The information processing apparatus according to claim 1, wherein a routing processing unit transmits to the transmission source node information that data transfer to the transmission destination node is impossible when receiving data to be transferred to the transmission destination node that uses the internode data transfer path unavailable from the transmission source node.

10. The information processing apparatus according to claim 1,
  wherein the information processing apparatus is a storage control device that controls data I/O (input/output) between a recording medium and a computer, and
  wherein serial data transfer between the root node and the plurality of nodes is performed under PCI Express (registered trademark) standard, the terminal nodes being switches used by PCI Express, the plurality of nodes including a disk adapter controlling data I/O with a recording medium, and a channel adapter controlling communication with the computer.

11. A method of transferring data by serial transmission in an information processing apparatus, the information processing apparatus comprising: a plurality of data transfer paths, through which serial data transfer is performed; and a plurality of nodes including a root node and terminal nodes coupled to a plurality of devices, the root node being coupled to each of the terminal nodes via the data transfer paths branching in a tree structure, and a pair of the terminal nodes coupled to each other via two data transfer paths without the root node, the method comprising:

storing, in the terminal nodes, routing information of the data transfer path related to a data transmission source and a data transmission destination which is defined so as to use the same data transfer path as an opposite side data transmission;

controlling, by the terminal nodes, data transmission using the data transfer path which is defined by the routing information;

transferring, by a first terminal node, of the terminal nodes, data to a first device coupled to a second terminal node, of the terminal nodes, via the first data transfer path according to the routing information, wherein the first terminal node is coupled to the second terminal node via a first data transfer path and a second data transfer path; and transferring, by the first terminal node, data to a second device coupled to the second terminal node via the second data transfer path according to the routing information.

* * * * *